(12) United States Patent
Lefebure et al.

(10) Patent No.: US 10,599,645 B2
(45) Date of Patent: Mar. 24, 2020

(54) BIDIRECTIONAL PROBABILISTIC NATURAL LANGUAGE REWRITING AND SELECTION

(71) Applicant: SoundHound, Inc., Santa Clara, CA (US)

(72) Inventors: Luke Lefebure, Mountain View, CA (US); Pranav Singh, Santa Clara, CA (US)

(73) Assignee: SoundHound, Inc., Santa Clara, CA (US)

( * ) Notice: Subject to any disclaimer, the term of this patent is extended or adjusted under 35 U.S.C. 154(b) by 254 days.

(21) Appl. No.: 15/726,394

(22) Filed: Oct. 6, 2017

(65) Prior Publication Data

US 2019/0108257 A1    Apr. 11, 2019

(51) Int. Cl.
*G06F 17/27* (2006.01)
*G06F 16/2453* (2019.01)
(Continued)

(52) U.S. Cl.
CPC ...... *G06F 16/24534* (2019.01); *G06F 17/271* (2013.01); *G06F 17/274* (2013.01);
(Continued)

(58) Field of Classification Search
CPC ............. G10L 15/187; G10L 2015/085; G10L 15/197; G10L 15/142; G10L 2015/025; G10L 15/12; G10L 15/19; G10L 17/16; G10L 2015/0636; G10L 15/26; G10L 2015/088; G10L 15/083; G10L 15/193; G06F 3/0482; G06F 3/04842; G06F 17/2745; G06F 16/433; G06F 16/434;
(Continued)

(56) References Cited

U.S. PATENT DOCUMENTS

2006/0224384 A1* 10/2006 Dow ............... G10L 15/005
  704/257
2008/0270110 A1* 10/2008 Yurick ............. G10L 15/06
  704/3

(Continued)

OTHER PUBLICATIONS

Y. Albert Park, et al, Automated Whole Sentence Grammar Correction Using a Noisy Channel Model, Proceedings of the 49th Annual Meeting of the Association for Computational Linguistics, pp. 934-944, Portland, Oregon, Jun. 19-24, 2011.
(Continued)

*Primary Examiner* — Huyen X Vo
(74) *Attorney, Agent, or Firm* — Fenwick & West LLP

(57) ABSTRACT

A speech recognition and natural language understanding system performs insertion, deletion, and replacement edits of tokens at positions with low probabilities according to both a forward and a backward statistical language model (SLM) to produce rewritten token sequences. Multiple rewrites can be produced with scores depending on the probabilities of tokens according to the SLMs. The rewritten token sequences can be parsed according to natural language grammars to produce further weighted scores. Token sequences can be rewritten iteratively using a graph-based search algorithm to find the best rewrite. Mappings of input token sequences to rewritten token sequences can be stored in a cache, and searching for a best rewrite can be bypassed by using cached rewrites when present. Analysis of various initial token sequences that produce the same new rewritten token sequence can be useful to improve natural language grammars.

19 Claims, 34 Drawing Sheets

(51) Int. Cl.
*G06N 7/00* (2006.01)
*G10L 15/183* (2013.01)

(52) U.S. Cl.
CPC ........ *G06F 17/277* (2013.01); *G06F 17/2785* (2013.01); *G06N 7/005* (2013.01); *G10L 15/183* (2013.01)

(58) Field of Classification Search
CPC ...... G06F 16/4393; G06F 16/48; G06F 16/61; G06F 16/685; G06F 19/3418; G06F 17/274; G06F 17/2755; G06F 17/28; G06F 16/78; G06F 16/7837; G06F 16/7844; G06F 3/012; G06F 3/013; G06F 3/016
See application file for complete search history.

(56) References Cited

OTHER PUBLICATIONS

John Lee, et al, Automatic Grammar Correction for Second-Language Learners, INTERSPEECH 2006—ICSLP, Sep. 17-21, 2006, Pittsburgh, Pennsylvania.

John Sie Yuen Lee, Automatic Correction of Grammatical Errors in Non-native English Text, PhD thesis, 2009 Massachusetts Institute of Technology.

Tim Paek, et al, Rapidly Deploying Grammar-Based Speech Applications with Active Learning and Back-off Grammars, Jan. 1, 2008, Microsoft Research.

Stephanie Seneff, et al, Automatic Induction of N-Gram Language Models from a Natural Language Grammar, Eighth European Conference on Speech Communication and Technology. 2003.

Matthew E. Peters, et al, Semi-supervised sequence tagging with bidirectional language models, Apr. 29, 2017.

Yangfeng Ji, Document Context Language Models, International Conference on Learning Representations (ICLR), Feb. 21, 2016.

Youssef Bassil, et al, Post-Editing Error Correction Algorithm for Speech Recognition using Bing Spelling Suggestion, (IJACSA) International Journal of Advanced Computer Science and Applications, vol. 3, No. 2, 2012.

Ahmad Emami, et al, A Neural Syntactic Language Model, Machine Learning, 60, 195-227, 2005, Springer Science + Business Media, Inc.

Ariya Rastrow, Practical and Effcient Incorporation of Syntactic Features into Statistical Language Models, PhD thesis, The Johns Hopkins University, May 2012.

Richard Schwartz, et al, Efficient, High-Performance Algorithms for N-Best Search, Jun. 1990.

Steve Austin, et al, Toward a Real-Time Spoken Language System Using Commercial Hardware, 1990.

* cited by examiner

Incorrect word
will there be andy rain today

Extraneous word
will there be like rain today
will there the be rain today

Cutoffs
is it going to ___
___ going to rain today

Stutters/Repetitions
what what is the weather
what how is the weather

Extensions/Wordiness
do we have rain for today

Background speech
it is working is it going to rain today

Unsupported Phrasing
today will it rain

FIG. 2

Incorrect character
今天活下雨吗

Extraneous character
今天会去下雨吗
今天的会下雨吗

Cutoffs
今天会下——
——雨吗

Stutters/Repetitions
今天天气怎么怎么样
今天天气什么怎么样

Extensions/Wordiness
我们今天是不是要会有雨

Background speech
他会不会今天会下雨吗

Unsupported Phrasing
下雨今天会吗

FIG. 3

CORPUS
what is
who is
when is
what is
who did

FIG. 5A

Forward SLM probabilities

|  | is | did |
|---|---|---|
| who | ½ | ½ |
| what | 1 | 0 |
| when | 1 | 0 |

FIG. 5B

Backward SLM probabilities

|  | who | what | when |
|---|---|---|---|
| is | ¼ | ½ | ¼ |
| did | 1 | 0 | 0 |

FIG. 5C

CORPUS
是什么
是谁
是哪里
是什么
去哪里

FIG. 6A

Forward SLM probabilities

|   | 哪里 | 什么 | 谁 |
|---|------|------|-----|
| 是 | ¼ | ½ | ¼ |
| 去 | 1 | 0 | 0 |

FIG. 6B

Backward SLM probabilities

|   | 是 | 去 |
|---|-----|-----|
| 哪里 | ½ | ½ |
| 什么 | 1 | 0 |
| 谁 | 1 | 0 |

FIG. 6C

GRAMMAR ACCEPTS
what is the weather
what will the weather be on <date>
what is the weather going to be <date>
what is the weather in <place>
what is the weather at <place>

FIG. 7

GRAMMAR ACCEPTS
天气怎么样
<日期>的天气如何
<日期>会是什么天气
<地点>的天气如何
在<地点>是什么天气

FIG. 8

| | what | is | the | weather | will | be | on | <date> | going | to | in | <place> | at | </s> |
|---|---|---|---|---|---|---|---|---|---|---|---|---|---|---|
| <s> | 0.69 | 0.02 | 0.02 | 0.041 | 0.02 | 0.02 | 0.02 | 0.019 | 0.02 | 0.02 | 0.02 | 0.018 | 0.02 | 0.03 |
| what | 0.02 | 0.48 | 0.02 | 0.022 | 0.19 | 0.02 | 0.03 | 0.023 | 0.02 | 0.02 | 0.02 | 0.022 | 0.02 | 0.04 |
| is | 0.02 | 0.02 | 0.73 | 0.017 | 0.02 | 0.02 | 0.02 | 0.018 | 0.02 | 0.02 | 0.02 | 0.017 | 0.02 | 0.03 |
| the | 0.01 | 0.01 | 0.01 | 0.825 | 0.01 | 0.01 | 0.01 | 0.011 | 0.01 | 0.01 | 0.01 | 0.011 | 0.01 | 0.02 |
| weather | 0.03 | 0.03 | 0.03 | 0.025 | 0.03 | 0.17 | 0.07 | 0.026 | 0.17 | 0.03 | 0.12 | 0.025 | 0.12 | 0.08 |
| will | 0.03 | 0.03 | 0.51 | 0.03 | 0.03 | 0.03 | 0.04 | 0.032 | 0.03 | 0.03 | 0.03 | 0.03 | 0.03 | 0.06 |
| be | 0.05 | 0.05 | 0.05 | 0.045 | 0.05 | 0.05 | 0.2 | 0.048 | 0.05 | 0.05 | 0.09 | 0.045 | 0.05 | 0.13 |
| on | 0.02 | 0.02 | 0.02 | 0.022 | 0.02 | 0.02 | 0.03 | 0.652 | 0.02 | 0.02 | 0.02 | 0.022 | 0.02 | 0.04 |
| <date> | 0.02 | 0.02 | 0.02 | 0.022 | 0.02 | 0.02 | 0.03 | 0.023 | 0.02 | 0.02 | 0.02 | 0.022 | 0.02 | 0.67 |
| going | 0.03 | 0.03 | 0.03 | 0.03 | 0.03 | 0.03 | 0.04 | 0.032 | 0.03 | 0.51 | 0.03 | 0.03 | 0.03 | 0.06 |
| to | 0.03 | 0.03 | 0.03 | 0.03 | 0.03 | 0.51 | 0.04 | 0.032 | 0.03 | 0.03 | 0.03 | 0.03 | 0.03 | 0.06 |
| in | 0.03 | 0.03 | 0.03 | 0.03 | 0.03 | 0.03 | 0.04 | 0.032 | 0.03 | 0.03 | 0.03 | 0.51 | 0.03 | 0.06 |
| <place> | 0.02 | 0.02 | 0.02 | 0.022 | 0.02 | 0.02 | 0.23 | 0.023 | 0.02 | 0.02 | 0.02 | 0.022 | 0.02 | 0.47 |
| at | 0.05 | 0.05 | 0.05 | 0.05 | 0.05 | 0.05 | 0.06 | 0.054 | 0.05 | 0.05 | 0.05 | 0.184 | 0.05 | 0.1 |

FIG. 9

| | what | is | the | weather | will | be | on | <date> | going | to | in | <place> | at | </s> |
|---|---|---|---|---|---|---|---|---|---|---|---|---|---|---|
| </s> | 0.03 | 0.03 | 0.03 | 0.128 | 0.03 | 0.04 | 0.03 | 0.285 | 0.03 | 0.03 | 0.03 | 0.231 | 0.03 | 0.03 |
| what | 0.01 | 0.01 | 0.01 | 0.036 | 0.01 | 0.01 | 0.01 | 0.01 | 0.01 | 0.01 | 0.01 | 0.012 | 0.01 | 0.83 |
| is | 0.73 | 0.02 | 0.02 | 0.056 | 0.02 | 0.01 | 0.02 | 0.016 | 0.02 | 0.02 | 0.02 | 0.018 | 0.02 | 0.02 |
| the | 0.02 | 0.48 | 0.02 | 0.072 | 0.02 | 0.02 | 0.02 | 0.02 | 0.02 | 0.02 | 0.02 | 0.024 | 0.02 | 0.02 |
| weather | 0.02 | 0.02 | 0.69 | 0.059 | 0.19 | 0.01 | 0.02 | 0.016 | 0.02 | 0.02 | 0.02 | 0.019 | 0.02 | 0.02 |
| will | 0.51 | 0.03 | 0.03 | 0.1 | 0.03 | 0.02 | 0.03 | 0.028 | 0.03 | 0.03 | 0.03 | 0.033 | 0.03 | 0.04 |
| be | 0.03 | 0.03 | 0.03 | 0.34 | 0.03 | 0.02 | 0.03 | 0.028 | 0.03 | 0.27 | 0.03 | 0.033 | 0.03 | 0.03 |
| on | 0.03 | 0.03 | 0.03 | 0.18 | 0.03 | 0.22 | 0.65 | 0.026 | 0.03 | 0.03 | 0.03 | 0.259 | 0.03 | 0.03 |
| <date> | 0.02 | 0.02 | 0.02 | 0.072 | 0.02 | 0.02 | 0.03 | 0.02 | 0.02 | 0.02 | 0.02 | 0.024 | 0.02 | 0.02 |
| going | 0.03 | 0.03 | 0.03 | 0.58 | 0.03 | 0.02 | 0.03 | 0.028 | 0.51 | 0.03 | 0.03 | 0.033 | 0.03 | 0.03 |
| to | 0.03 | 0.03 | 0.03 | 0.1 | 0.03 | 0.02 | 0.03 | 0.028 | 0.03 | 0.03 | 0.03 | 0.033 | 0.03 | 0.03 |
| in | 0.04 | 0.03 | 0.03 | 0.436 | 0.03 | 0.1 | 0.03 | 0.032 | 0.03 | 0.03 | 0.03 | 0.038 | 0.03 | 0.04 |
| <place> | 0.04 | 0.04 | 0.04 | 0.126 | 0.04 | 0.03 | 0.04 | 0.035 | 0.04 | 0.04 | 0.34 | 0.041 | 0.09 | 0.04 |
| at | 0.02 | 0.01 | 0.01 | 0.585 | 0.01 | 0.01 | 0.01 | 0.014 | 0.01 | 0.01 | 0.01 | 0.017 | 0.01 | 0.02 |

FIG. 10

```
        what is the weather in Hawaii
          H---H---H-----H----H----H----BWD
FWD--H---H---H-----H----H----H
```
FIG. 12A

```
                              ↔
        what is the weather pin Hawaii
                            L----H---BWD
FWD--H---H---H-----H-----L
```
FIG. 12B

```
                              ↔
        what is the weather under in Hawaii
                            L---H----H---BWD
FWD--H---H---H-----H------L
```
FIG. 12C

```
                        ←         →
        what is the weather Hawaii
                    L------H---BWD
FWD--H---H---H-----H------L
```
FIG. 12D

```
                              ← →
        what is the weather in in Hawaii
                            L--H--------BWD
FWD--H---H---H-----H----H--L
```
FIG. 12E

夏威夷 的 天气 怎么样
　　　大--大--大---大---BWD
FWD---大--大--大---大
　　　FIG. 13A

↔
夏威夷 跑的 天气 怎么样
　　　　小--大---大---BWD
FWD---大---小
　　　FIG. 13B

↔
夏威夷　下 的 天气 怎么样
　　　　小-大--大---大---BWD
FWD---大---小
　　　FIG. 13C

←　　→
夏威 夷 的 怎么样
　　小--大-大---大---BWD
FWD--大--小
　　　FIG. 13D

←　　→
夏威夷 的 的 天气 怎么样
　　　　小-大--大---大---BWD
FWD--大---大-小
　　　FIG. 13E weather <u>pin</u> Hawaii
FIG. 15A weather ___
    forecast .073
    in     .069
    Channel .033
    data    .013
    and    .005
FIG. 15B

___ Hawaii
to      .072
in      .059
and    .036
Honolulu .012
love    .003
FIG. 15C

```
the weather pin Hawaii today
```

FIG. 17A

```
the weather ___
            today     .083
            forecast  .076
            for       .052
            now       .038
            in        .029
```

FIG. 17B

```
___  Hawaii today
in    .102
for   .071
to    .054
over  .032
and   .011
```

FIG. 17C rewrite scores
```
in   .029 + .102 = 0.131
     .029 * .102 = 0.0030
     log(.029) + log(.102) = -2.53
for  .052 + .071 = 0.123
     .052 * .071 = .0037
     log(.042) + log(.071) = -2.43
```

FIG. 18C rewrite scores
去  .029 + .102 = 0.131
    .029 * .102 = 0.0030
    log(.029) + log(.102) = -2.53
在  .052 + .071 = 0.123
    .052 * .071 = .0037
    log(.042) + log(.071) = -2.43

FIG. 18D

```
what's the weather for Hawaii today
```
parse score: .29

```
what's the weather in Hawaii today
```
parse score: .35

FIG. 24

夏威夷在哪儿?
parse score: .29

夏威夷在哪里?
parse score: .35

FIG. 25

```
input: what the weather pin <place>
<date>
new: what's the weather in <place>
<date> input: will there be andy rain <date>
new: will there be any rain <date> input: is it going to
new: is it going to rain <date> input: what the weather pin <place>
<date>
new: what's the weather in <place>
<date> input: do we have rain for <date>
new: will there be rain on <date> input: what the weather in <place>
<date>
new: what's the weather in <place>
<date> input: <date> will it rain
new: will it rain <date>
```

FIG. 28

```
new: will there be any rain <date>
input: will there be andy rain <date> new: is it going to rain <date>
input: is it going to new: will there be rain on <date>
input: do we have rain for <date> new: will it rain <date>
input: <date> will it rain new: what's the weather in <place>
<date>
input: what's the weather for <place>
<date> (3)
input: what's the weather on <place>
<date> (2)
input: what the weather pin <place>
<date>
input: what the weather in <place>
<date>
input: what the weather for <place>
<date>
```

FIG. 29

BIDIRECTIONAL PROBABILISTIC NATURAL LANGUAGE REWRITING AND SELECTION

FIELD OF THE INVENTION

The present invention is in the field of speech recognition and natural language understanding.

BACKGROUND

Automatic speech recognition (ASR) is prone to errors.

ASR performs spectral analysis on audio signals and extracts features, from which the process hypothesizes multiple phoneme sequences, each with a score representing the likelihood that it is correct, given the acoustic analysis of the input audio. ASR proceeds to tokenize phoneme sequence hypotheses into token sequence hypotheses according to a dictionary, maintaining a score for each hypothesis. Tokens can be alphabetic words such as English words, logographic characters such as Chinese characters, or discernable elemental units of other types of writing systems. Tokenization is imprecise since, for example, English speakers pronounce the phrases "I scream" and "ice cream" almost identically. To deal with such ambiguities, ASR systems use the statistics of known frequencies of neighboring word tokens common in the spoken language to hypothesize which of multiple token sequence hypotheses is correct. For example, the word "ice" frequently follows the word "eat", as in "eat ice cream", but the word "I" rarely follows the word "eat". Therefore, if the word sequence hypotheses "I scream" and "ice cream" follow the word "eat", then the score of the word sequence hypothesis with "ice cream" increases while the score of the word sequence hypothesis with "I scream" decreases.

For example, Mandarin Chinese speakers pronounce the phrases "交代" and "胶带" identically. Therefore, speech recognition uses the statistics of known frequencies of neighboring tokens common in the spoken language to hypothesize which of multiple token sequence hypotheses is correct. For example, the word "胶" frequently follows the word "卷", as in "卷胶带", but the word "交" rarely follows the word "卷". Therefore, if the word sequence hypotheses "胶带" and "交代" follow the word "卷", then the score of the word sequence hypothesis with "胶带" increases while the score of the word sequence hypothesis with "交代" decreases.

Conventional speech recognition and natural language understanding systems are relatively inaccurate and slow. They can produce transcriptions that are grammatically incorrect. Furthermore, their grammar rules are complex to create and improve. Also, grammars usually do not capture all of the informal and approximate ways that users express themselves, and as a result have insufficient coverage.

SUMMARY OF THE INVENTION

The present invention relates to methods, systems, and software to program systems for rewriting the token sequences that result from speech recognition using a combination of forward and backward SLMs. This can involve computing scores for token sequences according to the combination of probabilities of the tokens within a sequence.

The present invention provides technical improvements to the accuracy of speech recognition, grammatical correctness of transcriptions, and enhancements to natural language grammars.

This can involve editing a token sequence by the deletion, insertion, or replacement of a specific token. A token whose forward and backward probabilities are both low is a candidate for deletion, or for replacement by a new token in the token sequence. An adjacent pair of tokens for which the earlier token has a low score in the backward direction and the later token has a low score in the forward direction is a candidate for deletion of either token, or for insertion of a new token in between.

Choosing a new token for insertion or replacement can involve checking either the forward SLM or backward SLM to create a list of the highest probability tokens or checking both SLMs to find a token with a high probability in both SLMs. In an embodiment that chooses a new token based on probabilities in both SLMs, the best choice is often one that is not the highest on either list, but rather one that is fairly high on both lists.

Any operation of deletion, insertion, or replacement creates a new token sequence, which has a new combined score. Some embodiments produce multiple possible rewritten token sequences, compute scores for each one, and choose to output the one with the best score. Some embodiments perform multiple successive rewrites of a token sequence.

Some embodiments submit token sequences as input to a natural language parser that determines parse scores for token sequences according to a set of grammar rules. In such embodiments, the ultimate choice of a best token sequence (the original or any particular rewrite) is determined by either the grammar parse score or a combination of the grammar parse score and the token sequence probability score. Some such grammar parsers simply produce an output indicating whether the token sequence is valid or invalid according to the grammar. Parsers for stochastic grammars assign probability scores to parses. Semantic parsers use semantic grammars, where the score of a parse may be affected by its semantics.

Some embodiments perform a partial syntactic analysis of token sequences, such as with part of speech tagging and the application of grammar patterns known to be legal within a spoken language.

Some embodiments use one or more of SLMs, syntax checks, and grammar rules that are general to a diverse corpus of expressions generally used in one or more entire human languages. Some use domain specific SLMs, syntax checks, and grammars, which can be more accurate at rewriting token sequences according to particular domains of knowledge.

Some embodiments use entity tagging to replace known specific tokens with special tag tokens that indicate their generic class. An example is to replace each token that is the name of a city with a tag that represents cities in general. This can improve the number of token sequences that satisfy a pattern, thereby making statistical probabilities more accurate.

Some embodiments perform rewrites on token sequences from real-time ASR within a delayed buffer of real-time speech. Some embodiments use larger delay buffers and attempt parsing of complete expression phrases.

Some embodiments store a history cache of tokens used recently, and increase the probability-based score of tokens that are present in the history cache. This improves accuracy by taking advantage of the fact that topic-specific words tend to be spoken multiple times within short periods of conversation.

Some embodiments store, in a cache, both original input token sequences and the chosen one or top few rewrites. This enables completion of future rewrite requests by a lookup in the cache, without the need for a new search of many possible rewrites. Some embodiments store rewritten token sequences and one or more input token sequences that resulted in the rewrite. This can provide useful information, especially when sorted by frequency of occurrence, for grammar developers to create and improve domain-specific grammars.

Whereas speech recognition systems that do not use bidirectional probabilistic rewriting might require relatively sophisticated and complex grammars, by using bidirectional probabilistic rewriting, speech recognition systems are able to expand the coverage of relatively simple grammars by mapping approximate expressions to grammatically correct ones. As a result, less sophisticated grammar developers are able to rely on the speech recognition system employing programmatic rules for bidirectional probabilistic rewriting as a tool supporting the creation of custom domain grammars that meet the requirements of their applications. This has the effect of both higher performance and more accurate speech recognition systems and natural language understanding systems.

BRIEF DESCRIPTION OF THE DRAWINGS

FIG. 2 shows typical speech recognition errors in English.

FIG. 3 shows typical speech recognition errors in Mandarin Chinese.

FIG. 5A shows a simple example corpus of English expressions.

FIG. 5B shows a forward SLM built according to the corpus of FIG. 5A.

FIG. 5C shows a backward SLM built according to the corpus of FIG. 5A.

FIG. 6A shows a simple example corpus of Mandarin Chinese expressions.

FIG. 6B shows a forward SLM built according to the corpus of FIG. 6A.

FIG. 6C shows a backward SLM built according to the corpus of FIG. 6A.

FIG. 7 shows a simple example natural language domain grammar in English.

FIG. 8 shows a simple example natural language domain grammar in Mandarin Chinese.

FIG. 9 shows a forward SLM built according to a diverse corpus of expressions parsed by the domain grammar of FIG. 7.

FIG. 10 shows a backward SLM built according to a diverse corpus of expressions parsed by the domain grammar of FIG. 7.

FIG. 12A shows an example of a correctly recognized expression in English.

FIG. 12B shows an example of a variant of the expression of FIG. 12A with a wrong token error causing low forward and backward probabilities at the replaced token according to an embodiment.

FIG. 12C shows an example of a variant of the expression of FIG. 12A with an extra token error causing low forward and backward probabilities at the inserted token according to an embodiment.

FIG. 12D shows an example of a variant of the expression of FIG. 12A with a missing token error causing a low backward probability on a token followed by a low forward probability on the immediately following token according to an embodiment.

FIG. 12E shows an example of a variant of the expression of FIG. 12A with a repeated token error causing a low backward probability on a token followed by a low forward probability on the immediately following token according to an embodiment.

FIG. 13A shows an example of a correctly recognized expression in Mandarin Chinese.

FIG. 13B shows an example of a variant of the expression of FIG. 13A with a wrong token error causing low forward and backward probabilities at the replaced token according to an embodiment.

FIG. 13C shows an example of a variant of the expression of FIG. 13A with an extra token error causing low forward and backward probabilities at the inserted token according to an embodiment.

FIG. 13D shows an example of a variant of the expression of FIG. 13A with a missing token error causing a low backward probability on a token followed by a low forward probability on the immediately following token according to an embodiment.

FIG. 13E shows an example of a variant of the expression of FIG. 13A with a repeated token error causing a low backward probability on a token followed by a low forward probability on the immediately following token according to an embodiment.

FIG. 15A shows a replacement error in an English expression according to an embodiment.

FIG. 15B shows a set of most likely intended tokens for the error of FIG. 15A using a 2-gram SLM in the forward direction according to an embodiment.

FIG. 15C shows a set of most likely intended tokens for the error of FIG. 15A using a 2-gram SLM in the backward direction with a common token near the highest probability for each direction according to an embodiment.

FIG. 16A shows a replacement error in a Mandarin Chinese expression according to an embodiment.

FIG. 16B shows a set of most likely intended tokens for the error of FIG. 16A using a 2-gram SLM in the forward direction according to an embodiment.

FIG. 16C shows a set of most likely intended tokens for the error of FIG. 16A using a 2-gram SLM in the backward direction with a common token near the highest probability for each direction according to an embodiment.

FIG. 17A shows a replacement error in an English expression according to an embodiment.

FIG. 17B shows a set of most likely intended tokens for the error of FIG. 17A using a 3-gram SLM in the forward direction according to an embodiment.

FIG. 17C shows a set of most likely intended tokens for the error of FIG. 17A using a 3-gram SLM in the backward direction with two common tokens near the highest probability for each direction but in different orders of probability according to an embodiment.

FIG. 17D shows calculations of a rewrite score for replacement of the error token with each of the common tokens with high probability for each SLM according to an embodiment.

FIG. 18A shows a replacement error in an English expression according to an embodiment.

FIG. 18B shows a set of most likely intended tokens for the error of FIG. 18A using a 3-gram SLM in the forward direction according to an embodiment.

FIG. 18C shows a set of most likely intended tokens for the error of FIG. 18A using a 3-gram SLM in the backward direction with two common tokens near the highest probability for each direction but in different orders of probability according to an embodiment.

FIG. 18D shows calculations of a rewrite score for replacement of the error token with each of the common tokens with high probability for each SLM according to an embodiment.

FIG. 24 shows example grammar parse scores for different token insertions in English according to an embodiment.

FIG. 25 shows example grammar parse scores for different token insertions in Mandarin Chinese according to an embodiment.

FIG. 28 shows the contents of a token history cache for translating input token sequences to rewritten token sequences according to an embodiment.

FIG. 29 shows the contents of a token history cache for translating rewritten token sequences to input token sequences according to an embodiment.

DETAILED DESCRIPTION

Introduction

A statistical language model (SLM) captures the statistics of neighboring words in a given corpus of expressions. Applying a SLM to token sequence hypotheses significantly improves the accuracy of ASR systems.

A forward SLM represents the conditional probability of the next token given one or a sequence of prior tokens. A backward SLM represents the conditional probability of an immediately prior token given one or a sequence of following tokens. Any given pair of tokens can have very different probabilities in each of the forward and backward direction. Consider the famous American baseball player, Joe DiMaggio. In a backward SLM, there is a very high probability that the word preceding DiMaggio is Joe because there are very few famous people with the family name DiMaggio. However, in a forward SLM the probability is fairly low for the word DiMaggio following the word Joe because there are many famous people named Joe.

Consider the famous leader during China's Three Kingdom's period, 诸葛亮. In a forward SLM, there is a very high probability that the word following 诸葛 is 亮 because there are very few famous people with the family name 诸葛. However, in a backward SLM the probability is fairly low for the word 诸葛 preceding the word 亮 because there are many famous people named 亮.

Expressions are sequences of tokens. In various embodiments, tokens are alphabetic words such as in the English language or logograms such as Chinese language written characters. In some embodiments, tokens can represent multiple words that represent a single concept, such as the two words, "New" and "York" that together represent a city or "纽" and "约" that together represent the city. In some embodiments, different tokens represent different meanings of words that have the same spellings such as the "tire" on a car and to "tire" by becoming sleepy or "生气" being angry and "生气" being vital and lively.

Figure 1:
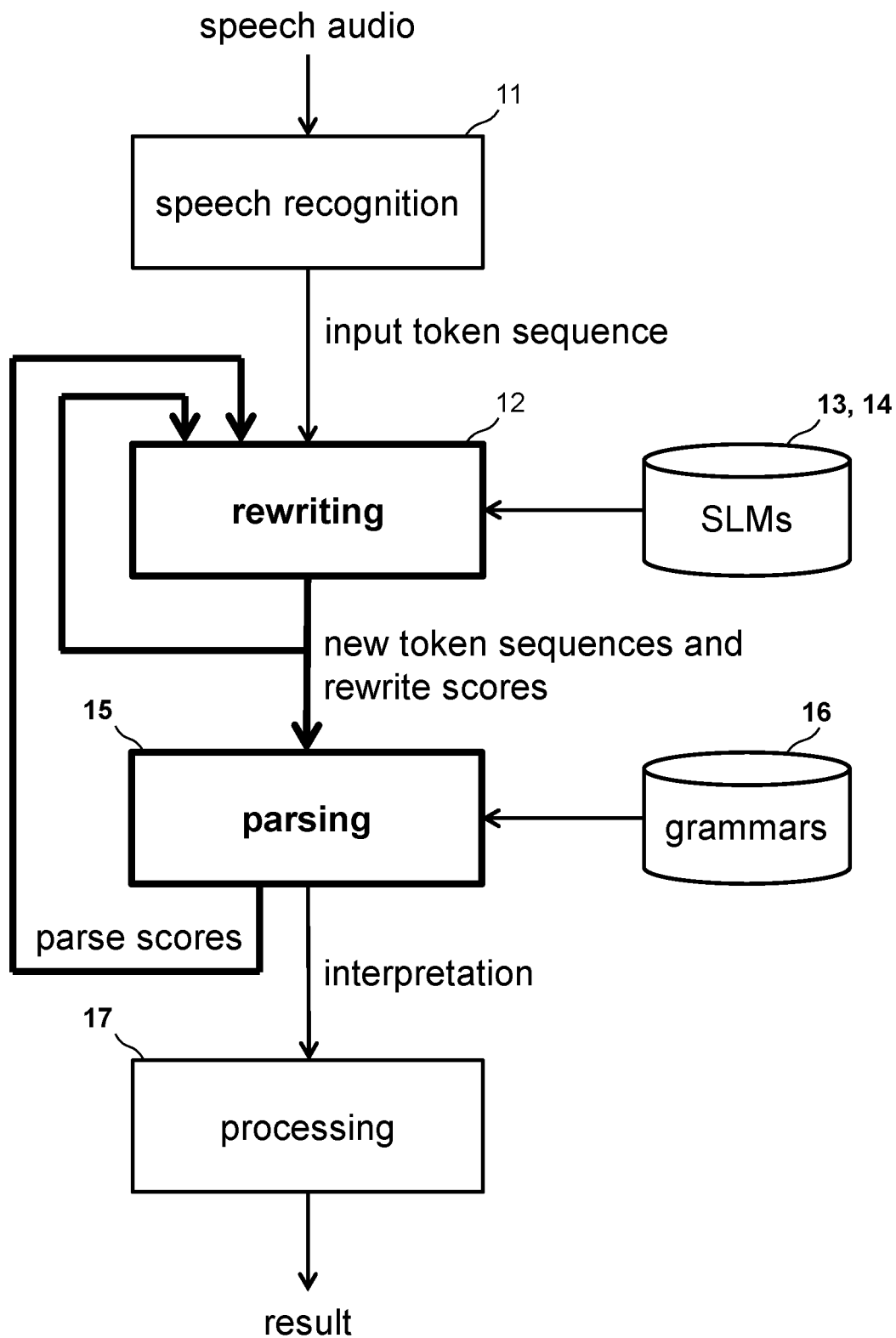
FIG. 1 shows a flow diagram of a speech-enabled natural language understanding and processing system according to an embodiment.

FIG. 1 shows a high-level view of a system for speech-enabled natural language processing. A speech recognition module 11 receives speech audio from a person issuing a spoken expression. The speech recognition module 11 produces a sequence of tokens. Some embodiments produce multiple alternative token sequences when it is not perfectly clear what the person said. Some such embodiments give probability weights to the alternatives.

Some embodiments receive token sequences from a person by means other than speech audio, such as typing on a keyboard, tapping on a touch screen, eye movement, gesturing with arms, hand or fingers, or neural electrical signaling.

A rewriting module 12 receives the token sequence as an input token sequence. It applies programmatic rules, as described below, to the token sequence to perform rewriting. In the case of multiple token sequences it processes each input token sequence either sequentially or in parallel. The rewrite module uses forward SLM 13 and backward SLM 14 to produce one or more new token sequences. Some embodiments produce a corresponding score for each new token sequence, the score indicative of the likelihood that the rewritten token sequence is what the person intended to express. Some embodiments feed new token sequences back into rewriting module 12 and reprocess them in an attempt to produce even better rewritten token sequences. This is useful if, for example, token sequences have multiple errors.

Some embodiments use a natural language parsing module 15. The parsing module receives the new token sequences or, in some embodiments, multiple new token sequences, and parses the token sequence(s) according to a domain-specific grammar 16 to produce natural language interpretations and parse scores corresponding to the interpretations. Some embodiments use multiple domain-specific grammars 16 and parse new token sequences according to each grammar 16. Some embodiments apply the rewrite score from rewriting module 12 as weights in the parsing. Some embodiments weight the parse score by the rewrite score to produce a best estimate that the interpretation is what the person intended.

Some embodiments feed the parse score back into the rewriting module 12, which uses the parse score to select one or more rewrites that are most likely correct among numerous possible rewrites.

Ultimately, a processing module 17 receives a highest-scoring interpretation, determines its intent and processes it accordingly, and produces a most-likely useful result. The processing module 17 produces the result and provides it as the system output to a user.

By using a rewriting module 12 embodiments are much more likely to determine the correct token sequence of the person's expression and therefore produce a correct interpretation and useful result. By further using rewrite score feedback and parse score feedback, embodiments are even more likely to determine the correct token sequence of the person's expression and therefore produce a correct interpretation and useful result. As a result, such embodiments increase the linguistic coverage of grammars (i.e., the portion of a corpus that is recognized by the grammars) by transforming erroneously recognized or grammatically incorrect input token sequences into grammatically correct forms, thereby effectively allowing the grammar to support flawed variants and perform error correction.

Bidirectional probabilistic natural language rewriting and selection expand the universe of expressions that grammars can interpret, which is effectively a form of grammar rule compression. It allows small grammars to support the range of expressions otherwise requiring much larger grammars. Correspondingly, it allows the same size of grammar to interpret a far wider range of human expressions.

Systems for automatic machine translation between human languages can also gain improved translation accuracy. Some such embodiments apply rewrites on ASR results before they are input to a translation module. The rewriting reduces the universe of expressions that might need to be translated, thereby allowing simpler translation rules to achieve the necessary requirement for translation accuracy.

Figure 30:
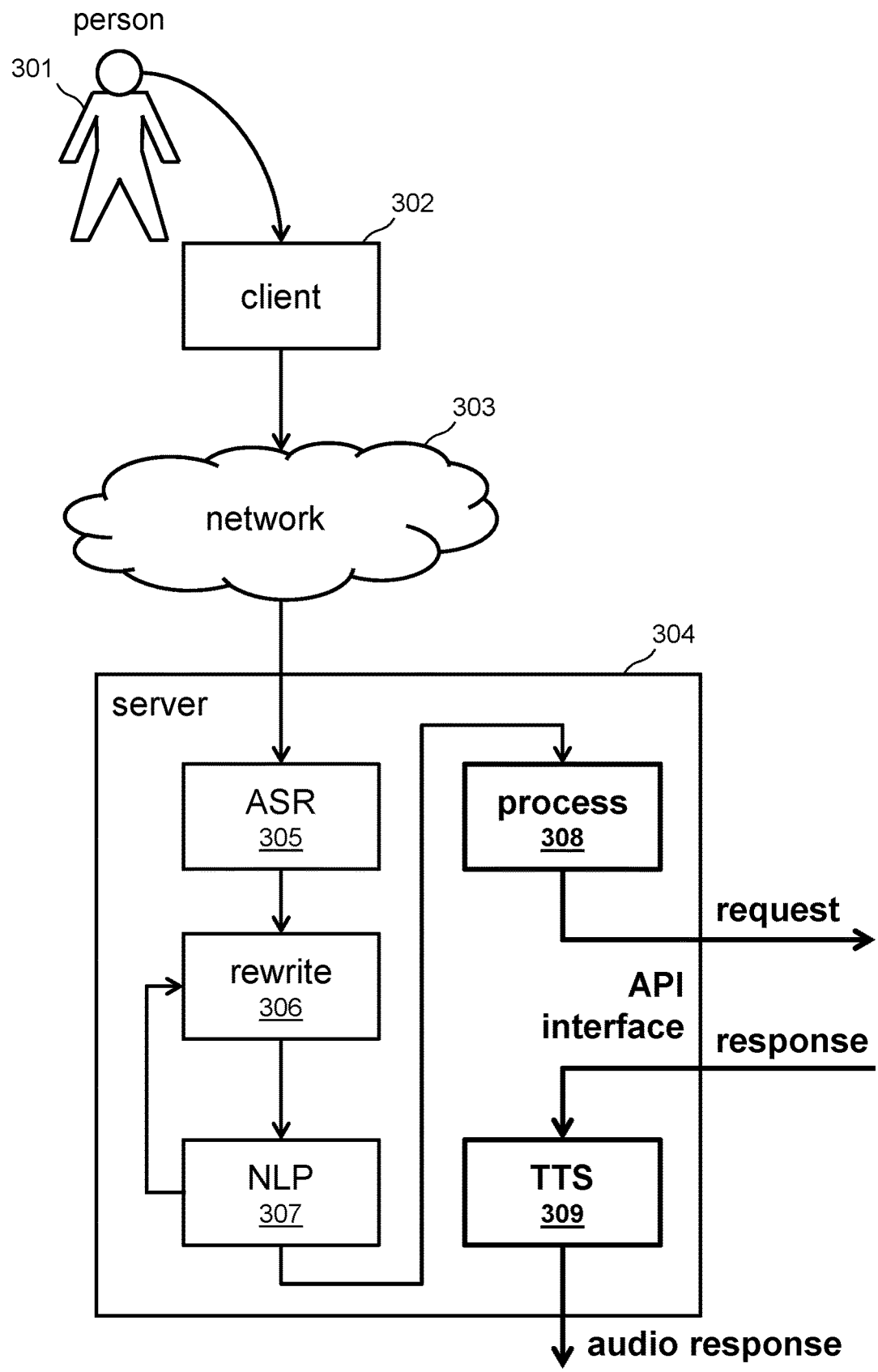
FIG. 30 shows user interaction with a server-based speech-enabled natural language understanding and processing system according to an embodiment.

FIG. 30 shows the elements of FIG. 1 in a server-implemented system that receives expressions from a user through a client coupled to the server through a network, as is typical for virtual assistants implemented as mobile phone apps or in-home devices. Some embodiments are self-contained and work independently of a network, as is typical for automotive systems, high-security systems, and extremely low-power systems.

FIG. 2 shows types and examples of English word token sequences for which a person intended to make a weather-related query, but which failed to parse correctly by a weather-related grammar.

FIG. 3 shows types and examples of Mandarin Chinese character token sequences for which a person intended to make a weather-related query, but which failed to parse correctly by a weather-related grammar.

Each example sequence in FIG. 2 and FIG. 3 is caused by one or more of the following four types of errors: wrong token, extra token, missing token, and repeated token. Each type of error can be corrected by one of the following three types of edits: token insertion, token deletion, and token replacement. Some embodiments do not have a token replacement type of edit, but achieve the same effect with a combination of a token deletion and a token insertion. Each of token insertion and token replacement creates a new token that was not present in the input token sequence. A system of programmatic rules, as described below, determines the choice of type of edit and position for making an edit for token rewriting based on conditional probabilities of tokens in view of preceding and following tokens.

For token replacement, the position of the edit is at the low probability token to be replaced. For token insertion, the position of the edit is between two tokens, the earlier having a low backward probability and the later having a low forward probability. For token deletion, the position of the edit can be at a token with a low probability in both directions, or at either of the tokens for which the earlier has a low backward probability and the later has a low forward probability.

Some embodiments perform multiple token replacements in a single rewrite. Some embodiments perform a single token replacement in any particular rewrite. Some such embodiments perform multiple rewrites iteratively.

Figure 4:
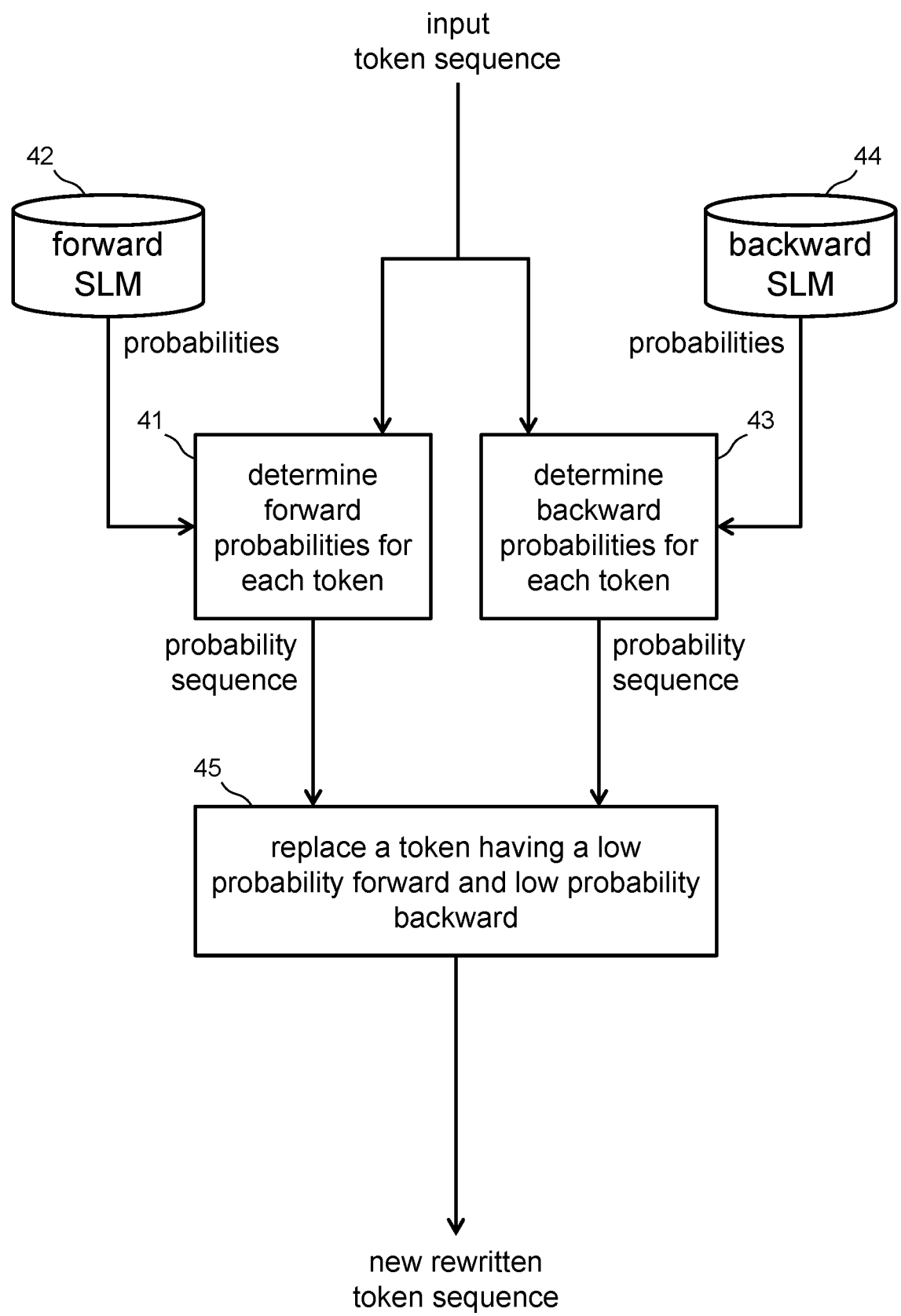
FIG. 4 shows a flow diagram of rewriting according to an embodiment.

FIG. 4 shows a token sequence rewrite flow for token replacement. A forward token probability module 41 receives an input token sequence and uses a forward SLM 42 to produce a forward probability for each token in the sequence. A backward probability module 43 receives the input token sequence and uses a backward SLM 44 to produce a backward probability for each token in the sequence. An edit module 45 receives the forward and backward probability sequences, finds a token position with a low probability in both the forward and the backward direction, and replaces that token with another to produce a new rewritten token sequence. Some embodiments as in FIG. 4 perform token replacement conditionally, only if it at least one token has a sufficiently low probability.

Some embodiments operate as in FIG. 4 but instead of performing a replacement in the edit module 45, perform a deletion of the token with the low probabilities.

Some embodiments operate as in FIG. 4 but instead of performing a replacement in the edit module 45, identify a pair of adjacent tokens for which the earlier one has a low probability in the backward direction and the later has a low probability in the forward direction. Some such embodiments insert a new token between the tokens in the pair. Some such embodiments replace either the first or the second token of the pair.

Thresholds

Some embodiments determine a low probability by comparing probabilities to thresholds. Some embodiments simply rewrite at the position with the lowest probability, without using thresholds. In some embodiments, thresholds are different in the forward and backward direction. In some embodiments, the thresholds depend on probabilities of neighboring tokens.

A good threshold level is one at a point in the probability distribution of all tokens in a corpus that allows a large majority of tokens to pass. A higher threshold causes more aggressive rewriting. Aggressive rewriting can correct more egregious token errors, but risks rewriting input token sequences to new ones that incorrectly represent the speaker's intent.

The distribution of forward token probabilities at the beginning of a token sequence has a higher entropy than the distribution after several tokens into the sequence from the beginning. Similarly, the backward token probabilities at the end of a token sequence are much more widely distributed than after several tokens into the sequence from the end. Some embodiments use a different threshold for the first or first few tokens in a sequence than for other tokens in the sequence.

Some embodiments, rather than using thresholds, choose for replacement the token with the lowest probability in either the forward, backward, or a combination of both the forward and backward directions.

Building SLMs

Choosing the most useful rewrites depends on having accurate SLMs. An SLM is most accurate if built from a corpus of expressions of the same type as the expressions to rewrite. For example, a corpus of expressions in Twitter™ tweets has very different SLM probabilities than a corpus of expressions from articles in the New York Times™ newspaper. Likewise, a corpus of expressions for a virtual assistant in general has different SLM probabilities than a corpus of expressions specific to a weather domain.

To enhance accuracy, the corpus used for building an SLM should contain only correct expressions—that is, expressions that an appropriate natural language grammar can parse or ones that score highly when parsed by a stochastic grammar. Furthermore, building an SLM using a corpus of expressions that refer to different specific entities (such as place names) creates many low probability sequences, one for each different specific entity. By replacing specific entity tokens with generic tags, the resulting SLM will have much higher probabilities for the same expressions with tags substituted for entities. To take advantage of an SLM built after tag substitution, it is useful for the token rewriting system to perform corresponding tag substitutions before performing token sequence rewriting.

FIG. 5A and FIG. 6A show small corpuses for purposes of example. Each corpus has five expressions, each having two tokens. FIG. 5B and FIG. 6B show the forward SLMs built from the corpuses. Each row corresponds to a sequence of most recent tokens (supporting only 1-token sequences). Columns correspond to the token following the sequence. Cells indicate probabilities. For example, in the SLM of FIG. 5B, after the token "who" there is ½ chance that the next token is "is" and in the SLM of FIG. 6B, after the token "是" there is ¼ chance that the next token is "哪里". FIG. 5C and FIG. 6C show the backward SLMs built from the corpuses. Each row corresponds to a sequence of following tokens (supporting only 1-token sequences). Columns correspond to the token preceding the sequence. For example, the in the SLM of FIG. 5C, for the token "is" there is a ¼ chance that the preceding token is "who" and in the SLM of FIG. 6C, for the token "哪里" there is a ¼ chance that the next token is "是". Note that forward and backward SLMs, represented as matrices, are not transposes of each other.

FIG. 7 shows an example of a simple natural language grammar for interpreting English expressions in a weather domain. FIG. 8 shows an example of a simple natural language grammar for interpreting Mandarin Chinese expressions in a weather domain. These grammars are just simple illustrative examples. They define too few phrasings to support the many ways that people can express queries about weather.

Note that the grammar uses tags <date> and <place> to represent date terminology and place names. An appropriate natural language processing system capable of performing entity tagging detects such entities and applies the grammar rules for whichever specific date term or place name is in the expression.

FIG. 9 shows a forward SLM built from a corpus with a large number of expressions that each match a phrasing in the grammar of FIG. 7. Each row corresponds to a sequence of most recent tokens (supporting only 1-token sequences). Other embodiments use sequences of more than one token to more accurately predict a next token. Columns correspond to the token following the sequence. Cells indicate probabilities. The symbols <s> and </s> indicate the beginning and end of a token sequence. For example, the probability that the first word at the beginning of a sequence is "what" is 0.69, and the probability that the last word at the end of a sequence is a date entity is 0.67. The probability that the word "what" follows the word "the" is 0.01, indicating that it is infrequent for people to say, "the what".

FIG. 10 shows a backward SLM built from a corpus with a large number of expressions that each match a phrasing in the grammar of FIG. 7. Each row corresponds to a sequence of following tokens (supporting only 1-token sequences). Columns correspond to the token preceding the sequence. It shows, for example, that the probability of a token sequence ending with the word "weather" is 0.128. The probability of the word "will" following the word "what" is 0.51, indicating that it is relatively common for people to say, "what will".

The examples of FIG. 5, FIG. 6, FIG. 9, and FIG. 10 show 2-gram (aka bigram) SLMs. That is, they show the probability of each token being adjacent to a particular one neighboring token. Some SLMs use 3-grams. That is, they show the probability of each token being adjacent to a particular sequence of 2 neighboring tokens. The probability of the word "be" following the word "will" is different from the probability of the word "be" following the 2 words "what will". Some SLMs use 4-grams or higher order n-grams.

Some embodiments build SLMs from a diverse corpus of expressions related to a wide variety of topics. That is useful to support a wide variety of expressions, such as all possible expressions in a particular human language.

Some embodiments build SLMs from a corpus of expressions related to just one domain. Such a corpus has much less diversity of expressions, which enhances the probability differences between n-grams for expressions in the domain. As a result, rewrites more accurately choose the tokens least likely to be correct for the domain. A corpus built from of a diverse range of expressions will be less accurate at choosing the best tokens for editing and, therefore, will require more rewrite choices to achieve the same accuracy for the particular domain.

Some embodiments filter a large number of expressions for ones that a domain-specific grammar can interpret as valid or that a domain-specific stochastic grammar parses with a score above a threshold. Such embodiments only use the passing expressions for its SLM training corpus. Some such embodiments further filter the corpus to only expressions that do not have a higher interpretation score in one or more other grammars. Some embodiments, in performing interpretations, consider context information such as location and user profile, or both.

It is possible to build SLMs without a corpus of expressions by using the set of expressions that a set of grammar rules can parse. Using a stochastic grammar as an expression generator can produce such an SLM, wherein the weights of grammar rules determine the probabilities of token sequences. Building an SLM from a grammar alone is only as successful as the grammar designer's ability to anticipate all ways that people can make expressions related to the grammar domain, and to estimate grammar weights. In practice, SLM probabilities are more accurate when built from a corpus of expressions. Building SLMs from grammars is most often used only for bootstrapping a system that will collect large numbers of expressions that can be used later to build a more accurate SLM. It is also possible to combine the SLM probabilities produced from a grammar alone and probabilities determined by building from an appropriate corpus.

Tagging

Figure 11:
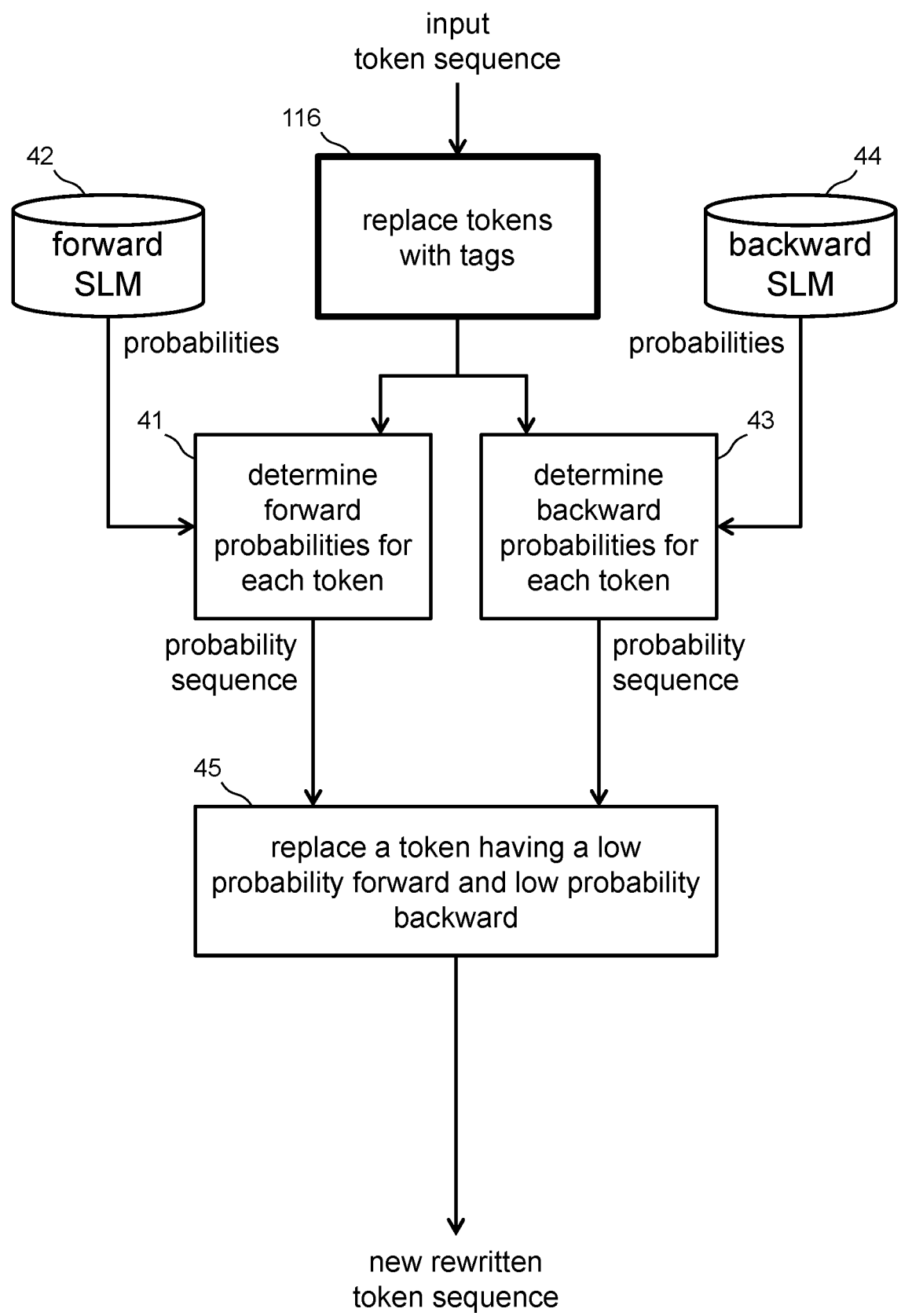
FIG. 11 shows a flow diagram of rewriting after token tag replacement according to an embodiment.

FIG. 11 shows a token sequence rewrite flow for a token replacement. The flow is the same as the flow in FIG. 4, but a tag module 116 receives the input token sequence and substitutes tags for tokens to create the token sequences for the probability modules 41 and 43.

A "tag" is a token generic to a class of tokens. For example, a <city> tag can substitute for any of the tokens "London", "Beijing", and the token sequence "New" "York". A <time> tag can substitute for any of the token sequences "1:23", "1:23 pm", "01:23 pm", "13:23", and "one twenty-three in the afternoon".

Some embodiments use domain-specific tags. For example, a weather domain can have a tag <weather condition>. The <weather condition> tag can substitute for the tokens "sunny", "cloudy", "foggy", "rainy", "windy", "hot", and "cold". The embodiment first accepts the oddly-phrased token sequence "it sunny or rainy will be"; substitutes tag instance <weather condition 1> for the token "sunny" and the tag instance <weather condition 2> for the token "rainy", while storing the association of each specific instance of the tag <weather condition> with its original token(s); rewrites the tagged token sequence to become "will it be <weather condition 1> or <weather condition 2>"; and eventually replaces the <weather condition> tag instances with their original specific tokens to produce the rewritten token sequence "will it be sunny or rainy". A weather domain grammar cannot parse the input token sequence "it sunny or rainy will be", but can parse the rewritten token sequence, "will it be sunny or rainy".

Some embodiments with domain-specific grammars tag all tokens that are not in the grammar as <unknown>. They perform rewrites with tags for the unknown tokens, then, after rewriting, replace the unknown token tags with their original tokens. Such an embodiment for an SMS text message domain has the tokens "send", "text", and "message" in its grammar. When receiving the token sequence "send message cow horse and chicken as a text message", the embodiment would tag the token sequence as "send message <unknown 1> <unknown 2> and <unknown 3> as a text message". The embodiment performs a rewrite to "send <unknown 1> <unknown 2> and <unknown 3> as a text message" and replaces the tags with their original tokens to produce the rewritten token sequence "send cow horse and chicken as a text message". Because of the common usage of English expressions, such an embodiment frequently receives token sequences with "send <unknown>" and very rarely "message <unknown>" it performs a deletion edit on the first occurrence of the token "message".

Some embodiments use an SLM built from a diverse corpus. Some such embodiments tag all words that appear in the corpus with low frequency with a <low frequency> tag. Tagging all low frequency words increases the probability accuracies for high frequency words.

Some embodiments perform a process of part of speech detection and labeling of tokens in the corpus. For tokens that can function as different parts of speech, such as the token "fast" being useful as an adjective (move quickly), verb (to not eat), and noun (period of time not eating), such embodiments include different entries in the SLM for the token when used as each different part of speech. Before computing token probabilities on token sequences for rewriting, such embodiments perform partial syntactic analysis on the token sequence to identify the likely part of speech of each token within the sequence. Doing so makes labeled token probabilities in SLMs more accurate.

Some embodiments perform synonym substitution both on expressions in the corpus and input token sequences. For example, such embodiments substitute a token "fast" for any of the tokens "rapid", "quick", and "speedy". As a result, SLM statistics are more accurate for a given corpus of diverse expressions.

Some domain-specific embodiments have sets of domain-specific reserved tokens that it may not rewrite. For example, in a domain for SMS messages, such an embodiment includes the tokens "text", "message", and "send" as ones that may not be replaced, deleted, or inserted as an edit operation. Some domain grammar formats allow for defining reserved keywords.

Detecting Error Types from Probabilities

The co-location or adjacency of positions of tokens with low probabilities in each of the forward and backward direction gives a clue as to the kind of likely error (wrong token, extra token, missing token, and repeated token) and therefore the likely best type of edit (token insertion, token deletion, and token replacement) to rewrite the token sequence.

FIG. 12A shows a sequence of English word tokens for an expression in which the backward and forward probabilities are both high (H). FIG. 13A shows a sequence of Mandarin Chinese character tokens for an expression in which the backward and forward probabilities are both high (大).

FIG. 12B for English words and FIG. 13B for Mandarin Chinese characters show expressions with a wrong token error (e.g., "pin" rather than "in" in FIG. 12B and "跑的" instead of "的" in FIG. 13B). All tokens following the wrong token have a high probability in the backward direction and all tokens before the wrong token have a high probability in the forward direction. The wrong token has a low probability in each of the backward and forward directions.

FIG. 12C for English words and FIG. 13C for Mandarin Chinese characters show expressions with an extra token error. All tokens following the extra token have a high probability in the backward direction and all tokens before the extra token have a high probability in the forward direction. The extra token has a low probability in each of the backward and forward directions.

FIG. 12D for English words and FIG. 13D for Mandarin Chinese characters show expressions with a missing token error (e.g., missing the token "in" between "weather" and "Hawaii" in FIG. 12D and missing token "天气" between "的" and "怎么样" in FIG. 13D). The token immediately before the missing token has a low probability in the backward direction, though all tokens following the position of the missing token have a high probability in the backward direction. All tokens before the missing token have a high probability in the forward direction, though the token immediately following the position of the missing token has a low probability in the forward direction.

FIG. 12E for English words and FIG. 13E for Mandarin Chinese characters show expressions with a repeated token error. The first of the repeated tokens has a low probability in the backward direction, though the second and all following tokens have a high probability in the backward direction. All tokens before and including the first of the repeated token have a high probability in the forward direction, though the second of the repeated token has a low probability in the forward direction.

Accordingly, a token that has a low probability in each of the backward and forward directions is suspicious. It indicates a position in which a deletion or replacement edit is likely appropriate. A pair of adjacent different tokens for which the earlier has a low probability in the backward direction and the later has a low probability in the forward direction is a suspicious pair of tokens. It indicates a position in which an insertion edit is likely appropriate. A pair of adjacent identical tokens for which the earlier has a low probability in the backward direction and the later has a low probability in the forward direction is a suspicious pair of tokens. It indicates a position in which a deletion of one of the identical tokens is likely appropriate.

Speech recognition is naturally probabilistic. Token sequences derive from one or more hypothesized sequences of spoken phonemes, which themselves derive from frames of digitally processed acoustic signal samples. Some embodiments produce scores representing the confidence in the accuracy of the recognition of each phoneme in phoneme sequence hypotheses. In some embodiments, processing frames of samples produces values that can contribute to the scores of phoneme hypotheses. Some embodiments, upon tokenizing phoneme sequence into token sequences, compute a score for each token, the score being, at least partially, based on the acoustic scores of the phonemes within the token.

Some embodiments compute backward and forward probability scores at least partially from the backward and forward SLM probabilities, weighted by acoustic scores for the tokens. As a result, for poor quality captured speech audio, such as ones with loud background sound events during certain tokens, such embodiments focus rewriting edits on such tokens.

Scoring and Comparing Rewrites

Scores can be represented in various ways, such as integers, floating point numbers, or alphanumerically. In some embodiments, scores correspond to Boolean values of validity (valid/invalid).

Various embodiments create a rewrite by identifying positions at which backward probabilities are below a threshold, forward probabilities are below a threshold, or a combination of backward and forward probabilities are below a threshold. Some such embodiments first create multiple alternative rewrites, each by making a single edit at a position with a probability score below a threshold, and then proceed to make further rewrites by editing at second positions within the first set of rewritten token sequences to create further rewrites. The effect is to create trees of rewrites or lattices of rewrites that account for the fact that replacement A followed by replacement B (at a different position) has the same result as B followed by A. For embodiments with high thresholds or instances of poor quality speech audio, the number of rewrites can become too large for available system resources. To accommodate such limits, various embodiments, to find the best rewrite, use graph algorithms such as building trees or lattices of rewrites using a breadth-first search algorithm, a depth-first search algorithm, or a best-first algorithm based on a measure of worthiness such as the best overall rewritten token sequence score.

Various embodiments create a rewrite by performing an edit at the position with lowest probability in the backward direction, the lowest probability in the forward direction, or a lowest combination of backward and forward probabilities on either the same or adjacent tokens as described above. In various embodiments, combinations are functions such as products, sums, or some equivalent. Some such embodiments create multiple rewrites to produce sets of rewrite hypotheses and compute rewrite scores for each in order to guide a selection of a best (most likely correct) rewrite. Some embodiments create multiple rewrites by making edits at each of the lowest and second lowest position and carrying on by making edits to the resulting token sequences of the first pair of rewrites.

Figure 14:
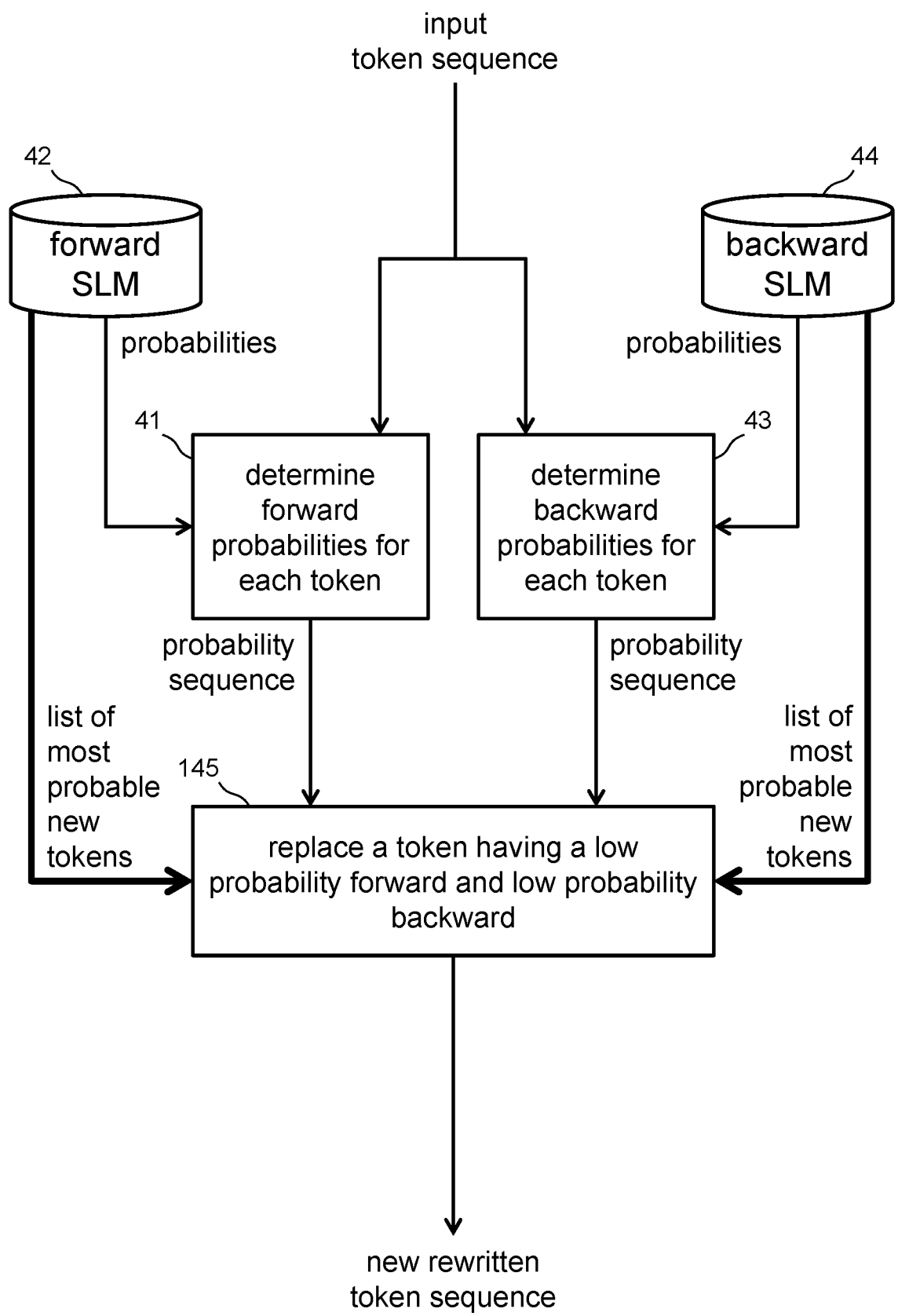
FIG. 14 shows a flow diagram of rewriting using a set of most probable tokens in the forward and the backward SLMs according to an embodiment.

FIG. 14 shows a token sequence rewrite flow for a token replacement. The flow is the same as the flow in FIG. 4, except that the token replacement module 145 reads lists of most probable tokens from each of the forward and backward SLMs. The list of forward most probable tokens for each position comprises, for the previous N tokens, a set of most probable tokens and their probabilities. The list of backward most probable tokens for each position comprises, for the following N tokens, a set of most probable tokens and their probabilities. For choosing a token for insertion or replacement, the token replacement module 45 searches for tokens present in both lists (the intersection of the lists) and chooses a new token based on the probability of the token in each list.

Some embodiments, if finding no token present in both lists, add the next most probable word from the SLM to the list. Various embodiments, if finding no token present in both lists, either choose the highest probability token from the forward list, choose the highest probability token from the backward list, or skip rewriting the token sequence.

FIG. 15A for English words and FIG. 16A for Mandarin Chinese characters show a 3-token sequence in which the middle token is incorrect. FIG. 15B and FIG. 16B show a list of 5 tokens and their probabilities from a 2-gram forward SLM (each token probability computed from one preceding token). FIG. 15C and FIG. 16C show a list of 5 tokens and their probabilities from a 2-gram backward SLM. The lists share two common tokens. The first common token is the second highest probability in each list. The second common token is fifth in the forward list and third in the backward list. Since the first common token is more common in both lists, it is the best choice for a token replacement edit.

FIG. 17A for English words and FIG. 18A for Mandarin Chinese characters show a 5-token sequence in which the middle token is incorrect. FIG. 17B and FIG. 18B show a list of 5 tokens and their probabilities from a 3-gram forward SLM (each token probability computed from the two preceding tokens). FIG. 17C and FIG. 18C show a list of 5 tokens and their probabilities from a 3-gram backward SLM. It is not necessary that the forward and backward SLMs use the same n-gram length. The lists share two common tokens. The first common token is the third highest probability in the forward list and second highest probability in the backward list. The second common token is fifth in the forward list and first in the backward list. Since two tokens are common to both lists, but the order of probabilities of the common tokens is different in the two lists, it is necessary to compute which is the better choice for a token replacement edit.

Some embodiments add the probabilities of the common tokens in each list and choose the token with the highest sum of its probabilities. Some embodiments multiply the probabilities of the common tokens in each list and choose the token with the highest product of its probabilities. Some embodiments add the log of the probabilities of the common tokens in each list and choose the token with the highest sum of logs of its probabilities, which gives the same relative order of results as multiplication, though different absolute values.

FIG. 17D and FIG. 18D show, for each of the common tokens, the calculation of adding probabilities, the calculation of multiplying probabilities, and the calculation of adding the logs of probabilities. The adding method finds a higher rewrite score for the second token, but the multiplying and sum of logs methods find a higher rewrite score for the first token. For some embodiments, the method of multiplying or adding logs is preferable. It has the effect of favoring tokens that are more reasonable in both directions, whereas the method of adding probabilities favors tokens that are sensible in one direction but nonsense in the other direction.

Detecting which of several homophones is correct for transcribing some given speech is a challenging problem. Some embodiments compute a rewrite score that applies a favorable weight to the probabilities of tokens that are homophones with a suspicious token in the input token sequence. As a result, such embodiments are much more accurate at choosing a homophone that is most likely in the context of its surrounding tokens.

Tokens have a much higher probability if they have been spoken recently in a conversation. Some embodiments cache recently spoken tokens. Some such embodiments do so only for tokens with high acoustic scores, in order to minimize the likelihood of a positive feedback loop promoting erroneous transcriptions. Some embodiments cache tokens spoken recently by multiple partners in a conversation, since tokens spoken by one partner are at higher probability for being spoken by the other.

Figure 19:
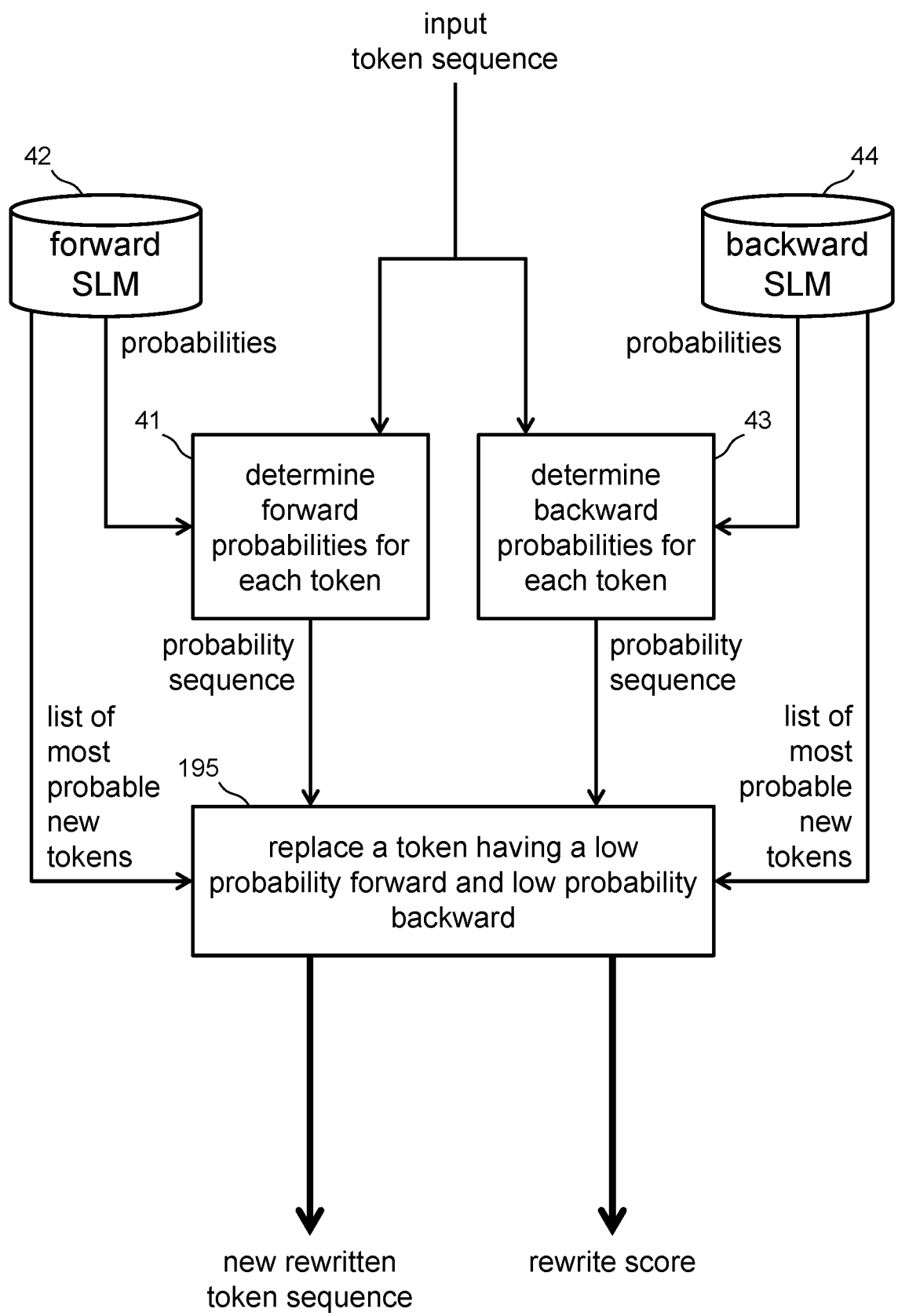
FIG. 19 shows a flow diagram of rewriting using a set of most probable tokens in the forward and the backward SLMs to produce a new rewritten token sequence and a corresponding score according to an embodiment.

FIG. 19 shows a token sequence rewrite flow for a token replacement. The flow is the same as the flow in FIG. 14, but the token replacement module 195 produces both a rewritten token sequence and a corresponding rewrite score. In some embodiments, the rewrite score is the product of the probability of each token in each of the forward and backward direction. In some embodiments, the rewrite score is the product of the probability of each token in each of the forward and backward direction, each token weighted by an acoustic score. Some embodiments that do not use entity tagging, such that entity values may be replaced, weight rewrite scores by the proximity of specific entities relative to environmental parameter values such as location or presence of specific people.

Figure 20:
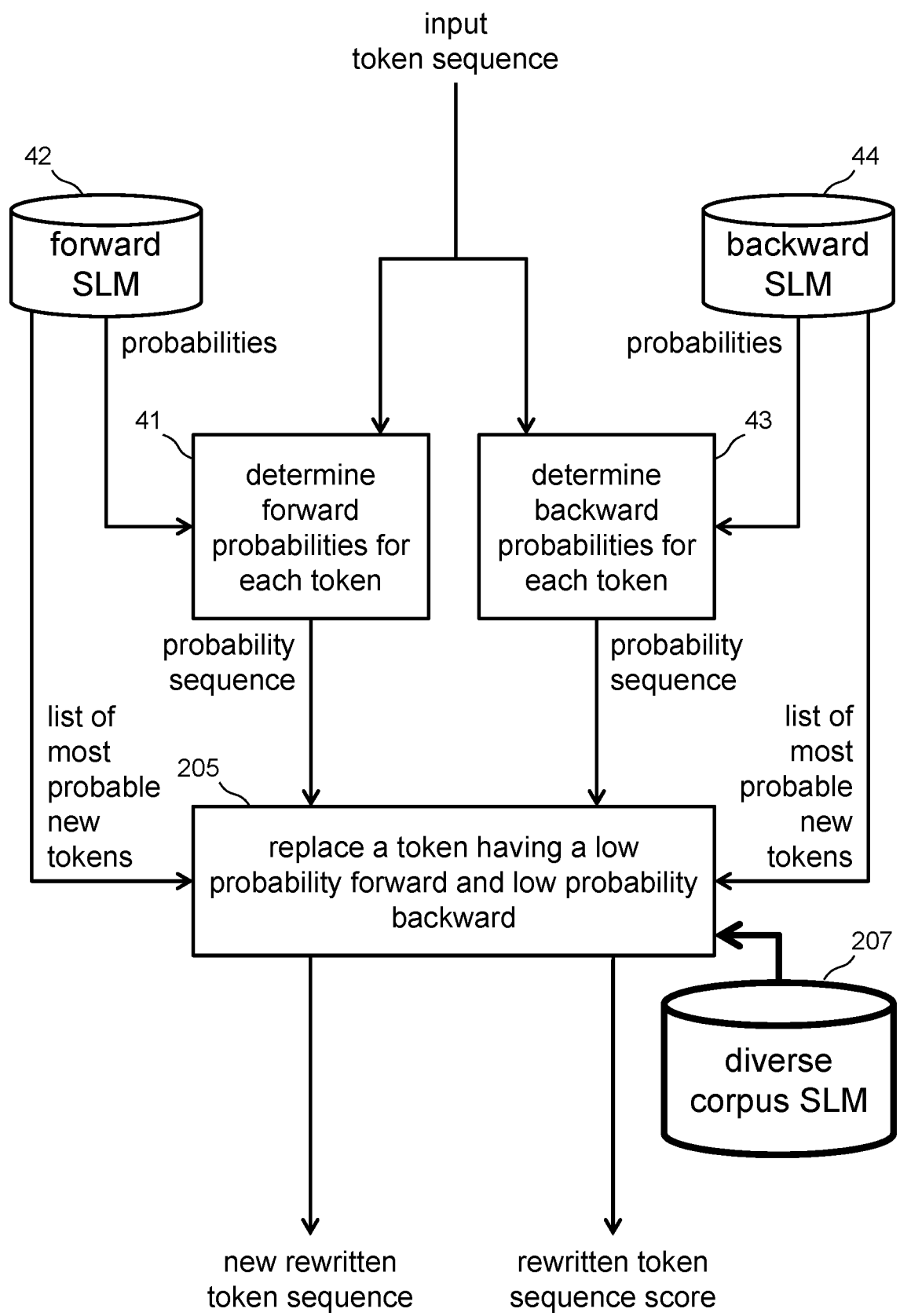
FIG. 20 shows a flow diagram of rewriting using a set of most probable tokens in the forward and the backward SLMs to produce a new rewritten token sequence and a corresponding score guided by a diverse corpus SLM according to an embodiment.

FIG. 20 shows a token sequence rewrite flow for a token replacement. The flow is the same as the flow in FIG. 19, but the token replacement module 205 reads token conditional probabilities from a diverse corpus SLM 207. The forward SLM 42 and backward SLM 44 are built from expressions specific to one domain of discourse. The diverse corpus SLM 207 is built from expressions across many domains, such as from diverse sources of expressions limited only by the fact that they use a single human language. Some embodiments scale the domain-specific conditional probabilities of each token in input token sequences based on the corresponding conditional probability of each token in the diverse corpus SLM 207. Some embodiments scale the domain specific conditional probabilities of each replacement token in the list of most probable tokens based on the corresponding conditional probability of each token in the diverse corpus SLM 207. Some embodiments use a single direction diverse corpus SLM and some embodiments use diverse corpus SLMs for each direction.

In some embodiments, a score for a token is weighted by properties of a user profile, such that the score is a combination of the score normally appropriate for the common SLM and a weight according to the recent prior expression of the token by the user. Specifically, tokens within each user's past expressions can improve the score of tokens within the list of highest probability forward tokens and the list of highest probability backward tokens. This can give a best accuracy improvement for people that only make simple expressions and scale back rewriting of low probability tokens for people who tend to make complex expressions.

Some embodiments improve the score of tokens by weighting the probability scores of tokens according to the geographic proximity of locations represented by the tokens in the list of highest probability forward tokens and the list of highest probability backward tokens.

Figure 21:
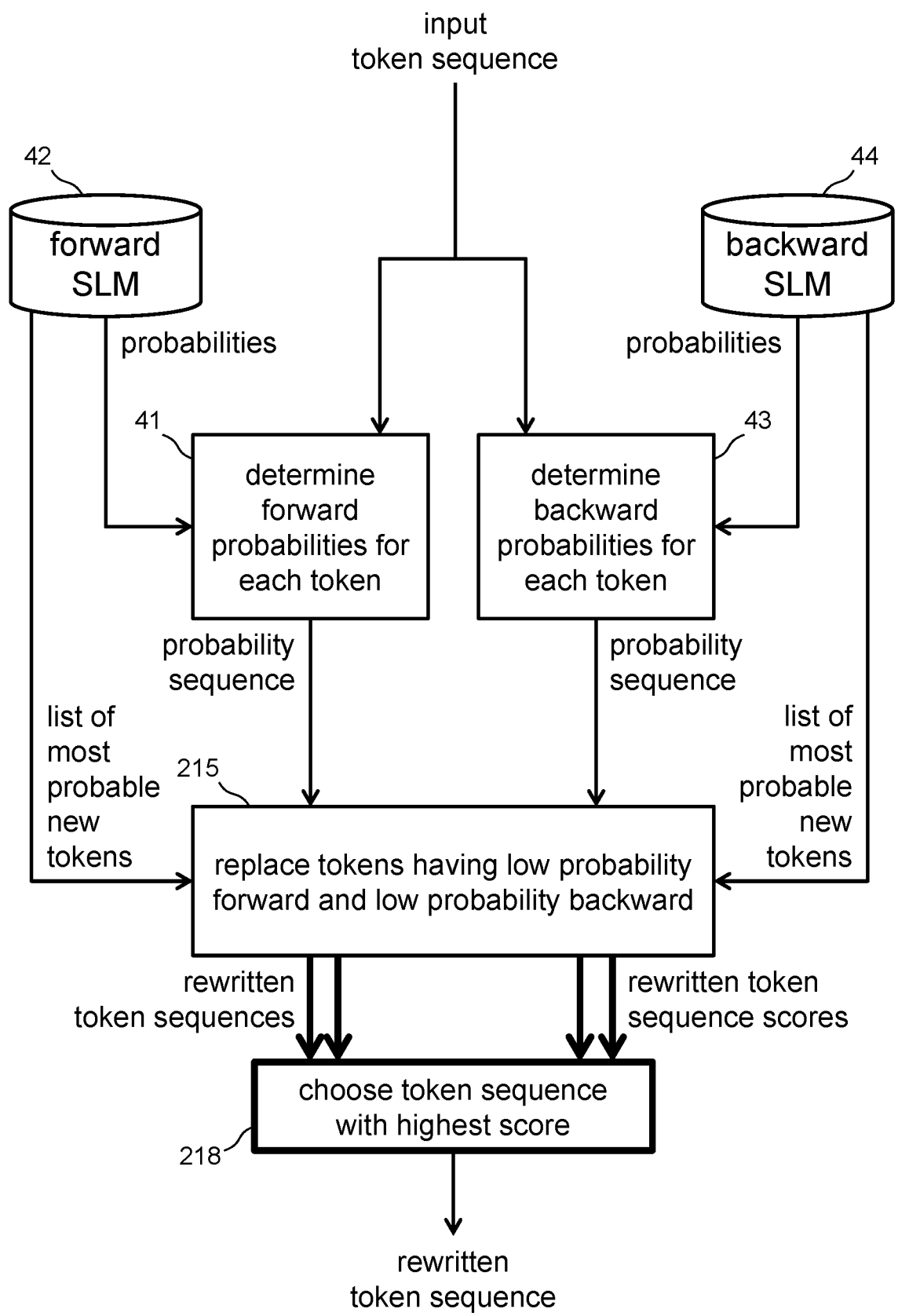
FIG. 21 shows a flow diagram of rewriting using a set of most probable tokens in the forward and the backward SLMs to produce a plurality of new rewritten token sequence and corresponding scores and choosing the rewritten token sequence with the highest score according to an embodiment.

FIG. 21 shows a token sequence rewrite flow for a token replacement. The flow is the same as the flow in FIG. 19, but the token replacement module 215 produces a set of multiple rewritten token sequences and a rewrite score associated with each rewritten token sequence. A choosing module 218 uses the rewrite scores to choose a best-rewritten token sequence among the multiple alternative rewrites. Some alternatives may have different edits at the same position. Some alternatives may have edits at different positions.

Parsing to Compute Parse Scores

Figure 22:
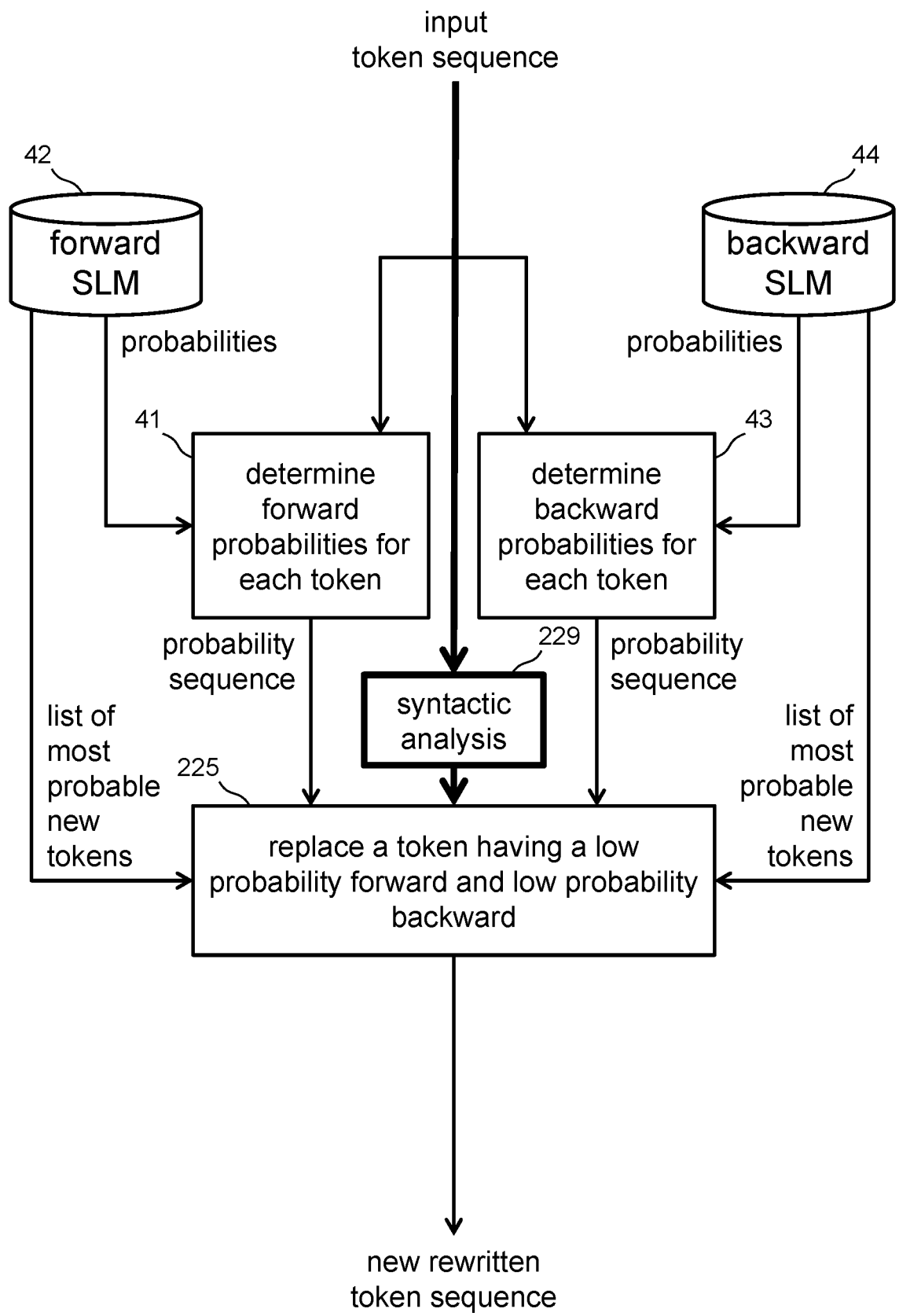
FIG. 22 shows a flow diagram of rewriting using syntactic analysis to guide selection of a most probable tokens from sets in the forward and the backward SLMs according to an embodiment.

Some embodiments use further advanced processing beyond SLM probabilities and weighted scores to determine best rewrites. FIG. 22 shows an embodiment that uses syntactic analysis. The embodiment shown is the same as FIG. 14, except the token replacement module 225 produces multiple rewrites and chooses a highest scoring one to produce the new rewritten token sequence. Furthermore, the token replacement module 225 uses a syntactic analysis input to weight rewrite scores.

A syntactic analysis module 229 receives the input token sequence and determines what parts of speech each token can be and the frequency of the token's use as each part of speech. The token replacement module 225 applies syntax rules as to the legality of arrangement of tokens of different parts of speech. The token replacement module 225 restricts its choice of new tokens to only tokens that are syntactically legal in context of neighboring tokens. For each rewrite, the token replacement module 225 scores the rewritten token sequences according to the legality of the arrangement of tokens of particular parts of speech.

Figure 23:
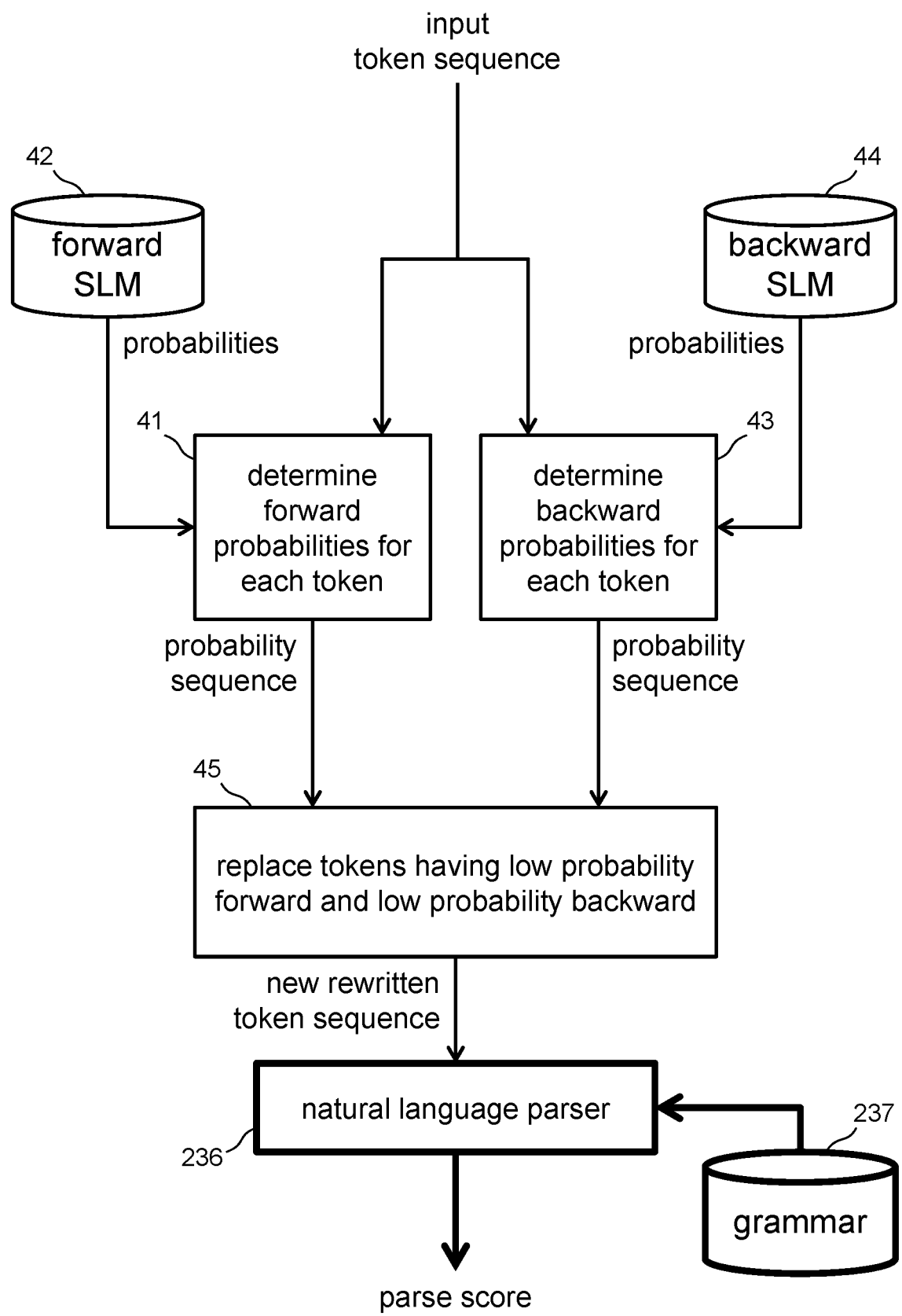
FIG. 23 shows a flow diagram of rewriting followed by natural language parsing using a domain grammar according to an embodiment.

Some embodiments parse new rewritten token sequences, according to a grammar, using a natural language parser to produce a parse score. FIG. 23 shows a token sequence rewrite flow for a token replacement. The flow is the same as the flow in FIG. 4. However, a natural language parser 236 receives the new rewritten token sequence output from the token replacement module 45. The natural language parser parses the new rewritten token sequence according to grammar rules defined by a natural language grammar 237.

Some embodiments use simple grammars that produce Boolean value scores. That is, either the grammar is able to parse the token sequence or not. Some embodiments use stochastic grammars that assign to parses integer or floating-point scores.

In some embodiments, grammar rules define the likelihood of different phrasings. A grammar may be able to parse two different expressions to derive the same meaning (produce the same resulting interpretation data structure), but with an indication of which is the more commonly used expression, or phrase or word within the expression. Some embodiments compute a score for the parsed expression by considering the phrasing of the expression and its usage likelihood among speakers. Some such embodiments compute such a parse score by multiplying weights of the phrases or words within grammar rules. Some embodiments combine a syntactic parse score with a semantic score to determine the score of an interpretation.

FIG. 24 shows two English expressions that have the same meaning according to a weather domain stochastic grammar. One uses the word "for" and the other uses the word "in". Since more speakers prefer the phrasing with "in", it has a higher score. FIG. 25 shows two Mandarin Chinese expressions that have the same meaning according to a weather domain stochastic grammar. One uses the word " 里 " and the other uses the word " 儿 ". Since more speakers prefer the phrasing with " 儿 ", it has a higher score.

Some embodiments with grammars maintain a cache of recent conversation state history information. For example, conversation state can include the semantic values of entity slots within natural language grammar rules. "New York" is a semantic value of a "place" type of entity within the "place" slot of a weather-related grammar rule that responds to the expression, "what is the weather in X", where X is a place. Therefore, after an expression, "what is the weather in New York", embodiments that store conversation state would have a record of "New York" being the most recently referenced place.

Conversation state can also include the type of question previously asked. It can also include identifiers of relevant parameters of entities. It can also include information about qualifiers and information filtering information. Some embodiments weight their parse scores according to the semantic saliency of the tokens in the context of conversation state, which can be expressed as a parse score.

Some embodiments attempt to parse rewritten token sequences according to a plurality of domain-specific grammars. If at least one domain grammar parses the rewritten token sequence with an acceptable score, the rewrite is successful.

Figure 26:
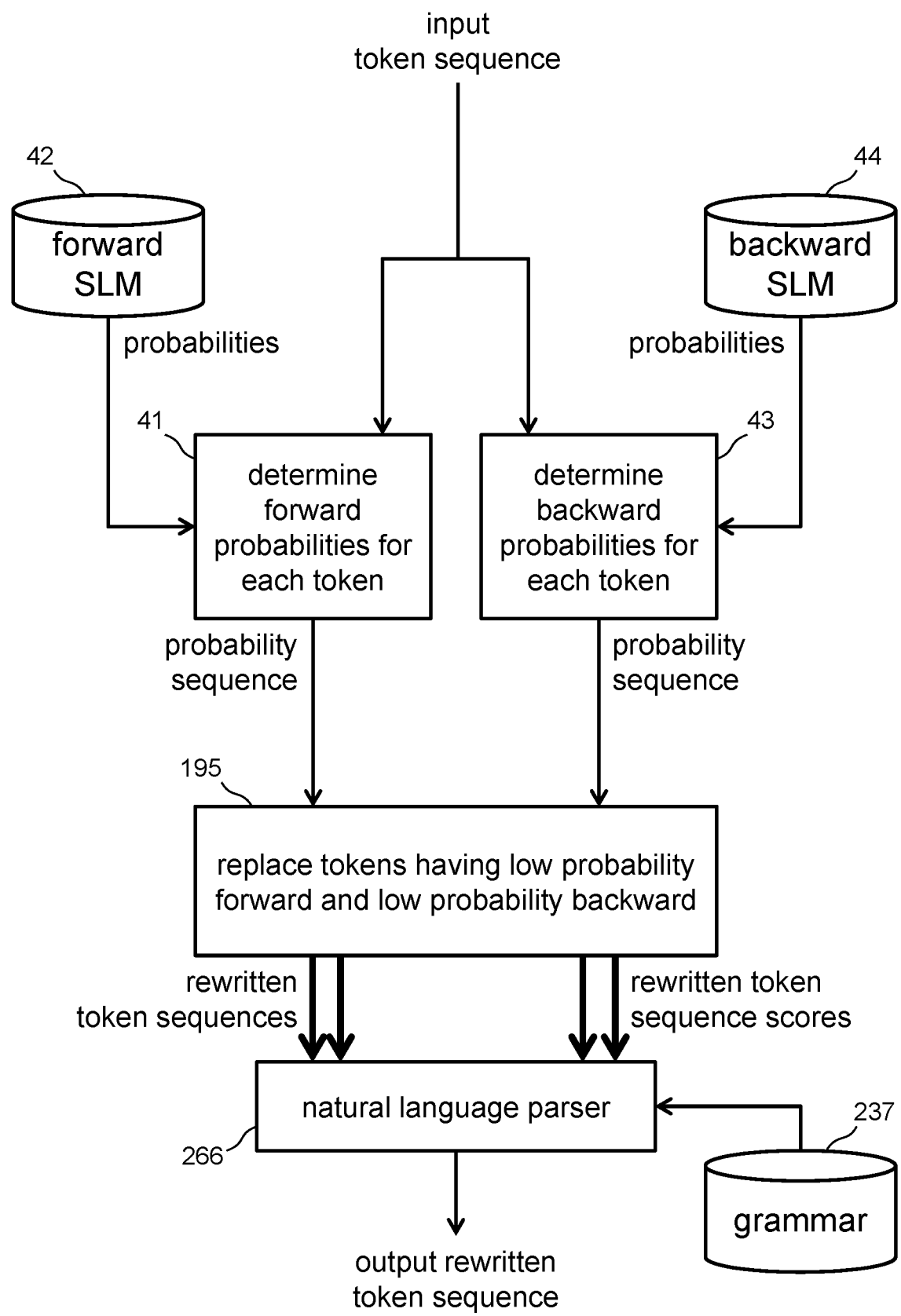
FIG. 26 shows a flow diagram of rewriting to produce a plurality of new rewritten token sequences and corresponding scores followed by natural language parsing using a domain grammar to choose a highest scoring rewritten sequence according to an embodiment.

FIG. 26 shows a token sequence rewrite flow for a token replacement. The flow is the same as the flow in FIG. 19, but a natural language parser 266 receives the set of rewritten token sequences and associated scores, attempts to parse each token sequence according to grammar 237 to produce a parse score, and chooses as its output the rewritten token sequence with the best combination of parse score and rewrite score. Some such embodiments parse according to multiple grammars. Some such embodiments thereby produce an output token sequence that is effectively a combination of an acoustic score, rewrite score according to SLMs, and a grammar parse score.

Iteratively Creating Sets of Rewrites

Some embodiments, upon finding a successful rewrite, complete their processing and provide the successful rewritten token sequence as output. Some embodiments produce lists of possible rewrites of input token sequences. That is possible either by making different edits at the same suspicious position, making edits at different suspicious positions, or both.

Some embodiments, in order to correct multiple wrong words or errors causing multiple extra words, missing words, or repeated words, feed rewritten token sequences through additional iterations of the rewriting flow. Iteration can proceed either by creating simple lists of rewrites or by selecting rewrites for reprocessing based on either their rewrite score, their grammar parse score, or a combination of both. Selection may work by attempting a depth-first, breadth-first, or best-score-first search tree algorithm.

FIG. 1 shows a process of iteratively rewriting new token sequences. Some embodiments, after the rewriting stage 12 reprocess the new token sequences according to their rewrite scores. Some embodiments, after the parsing stage 14, reprocess new rewritten token sequences according to their parse scores.

Continuous Transcription

Rewriting of token sequences can be useful in continuous transcription applications, such as automatic captioning of live television broadcasts or dictation.

Bidirectional probabilistic rewriting is useful when there is an endpoint from which to compute backward SLM probabilities. That is possible with a token buffer that makes available the most recent N tokens in a sequence with a sufficiently high tokenization hypothesis score, where N is the number of tokens used in the backward SLM probability calculation. That requires a transcription delay of at least N tokens of time.

English speakers tend to speak at 150 word tokens per minute. Mandarin Chinese speakers tend to speak at around 300 characters per minute. Since many Mandarin Chinese tokens comprise two or three characters, the token rate of speaking is also approximately 150 tokens per minute. That is 2.5 tokens per second. Therefore, bidirectional rewriting using a 2-gram backward SLM would require at least 1 second of buffering delay.

For continuous speech applications, in order to apply grammar parsing to bidirectional probabilistic rewriting, all tokens of a complete expression, or at least a complete phrase, are needed in order to determine that the sequence can be parsed. Such an application requires a phrase boundary detection algorithm upstream of rewriting and selection. Various such algorithms are known in the art. Some phrase boundary detection algorithms are grammar-based. Some benefit by detecting changes in speaking voice. Some benefit from detecting corresponding video scene changes. A pause of sufficient length can also force a commitment.

Since people tend to speak expressions with up to 25 tokens, at a token rate of 150 tokens per minute, a buffer and potential delay of up to 10 seconds is required. While that is an unacceptable captioning delay for movies or pre-recorded television shows, it is reasonable for television news feeds and some sports broadcasts. By processing full expressions at a time, the caption display would add text expression-by-expression, as is common in movies and pre-recorded television shows, rather than conventional word-by-word display, which is common in live television broadcasts.

Some embodiments may delay the video stream from the broadcast in order to synchronize it with the delay required for rewrites by expression separation and grammar-based scoring and selection.

Some embodiments perform the process of speech transcription using hypotheses such as phoneme hypotheses, tokenization hypotheses, and phrase boundary hypotheses. Such embodiments build trees of hypotheses with scores for each branch of the tree. Some such embodiments perform bidirectional probabilistic natural language rewriting on each of various tokenized expression hypotheses, compute a resulting rewrite parse score, and select a best tree branch according to the best rewrite parse score of each branch.

History Caching and Reverse Caching

Some embodiments improve performance by using one or more caching techniques. Some embodiments cache, at least for a finite duration, tokens with strong acoustic hypothesis scores. When selecting tokens from lists of forward and backward SLM highest probability tokens, such embodiments increase the probability score of tokens if they are present in the cache. This takes advantage of the temporal locality of words in conversations with the effect of to improving recognition accuracy. Various embodiments cache words before entity tagging to improve recognition of entity names or after entity tagging to ease integration with entity-independent rewriting.

Figure 27:
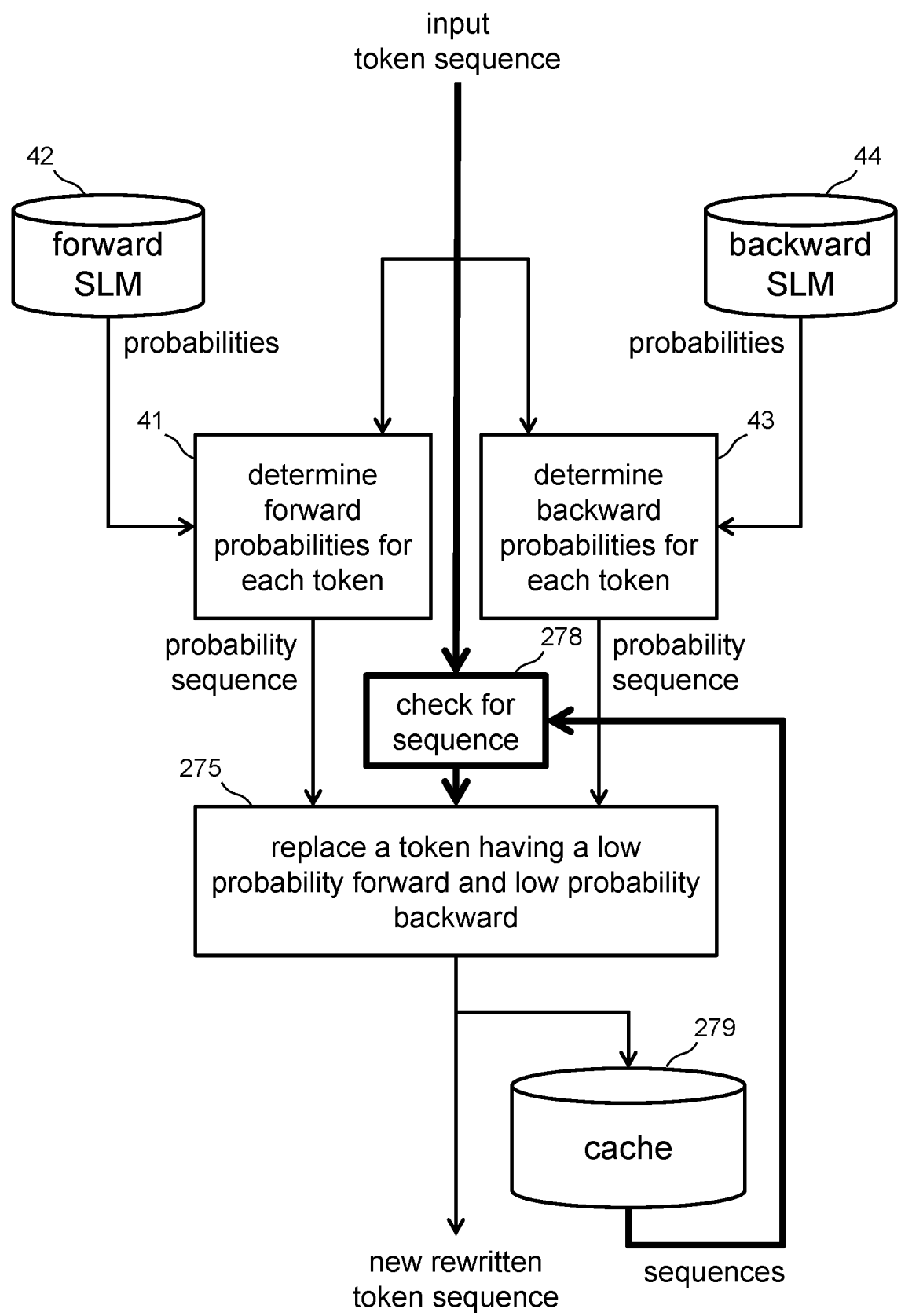
FIG. 27 shows a flow diagram of rewriting followed by token history caching to automate rewriting according to an embodiment.

Some embodiments cache mappings of input token sequences to new rewritten token sequences. FIG. 27 shows a token sequence rewrite flow that is the same as the flow in FIG. 4. However, a sequence checking module 278 receives the input token sequence. The sequence checking module proceeds to read from a cache 279 that comprises mappings of input token sequences to new rewritten token sequences. If the sequence checking module 278 finds an input token sequence in the cache, the sequence checking module 278 provides the associated new rewritten token sequence to the token replacement module 275. Upon receiving a new rewritten token sequence from the sequence checking module 278, the token replacement module 275 directly outputs the new rewritten token sequence. Otherwise, the token replacement module 275 performs an appropriate rewrite analysis, including rewrites using the lists of high probability SLM tokens. As a result, the flow does not need to perform a processing-intensive graph algorithm for the best rewrite of token sequences received in the past.

FIG. 28 shows seven entries of a token rewrite cache. Each input token sequence (with tagged entities) is associated with exactly one new rewritten token sequence.

Some embodiments use reverse caching that can associate new rewritten token sequences with pluralities of input token sequences. FIG. 29 shows five entries of a reverse token rewrite cache. The last of the cache entries is a rewrite commonly created from each of five different input token sequences. The frequency of each input token sequence that created the last new token sequence in the cache is shown in parentheses. Some embodiments analyze the cache contents to find the most frequent input token sequence that was rewritten to a specific new rewritten token sequence. This is useful for grammar developers to discover commonly used alternate phrasings in order to improve their grammars and add them to the grammar rules or create different grammar rules to handle rewrites for which the input token sequence does not match the intent of the expression. For example, if "will the weather be good" is rewritten to "what will the weather be", a systems engineer could create a new grammar rule that supports the former phrasing and responds with a yes or no based on a forecasted weather condition.

Some embodiments comprise an automatic grammar induction module that uses the reverse rewrite cache to improve coverage by inferring new grammar rules or extending existing grammar rules.

Improving stochastic grammars, either by adjusting weights of specific tokens or changing rules, improves the ability for a system operator to generate accurate SLMs. Furthermore, improving stochastic grammars improves the filtering of corpuses to build accurate domain-specific SLMs.

Other Considerations

The embodiments shown and described herein are exemplary of many optional features. Numerous embodiments are possible with different combinations of the features shown and described. Examples shown and described use the English and Mandarin Chinese languages. Various embodiments operate, similarly, for other languages or combinations of languages. Examples shown and described use a weather domain. Various embodiments operate similarly for other domains or combinations of domains. Examples shown and described show a module for token replacement. Similarly arranged modules can perform token deletion and token insertion.

FIG. 30 shows an embodiment of a virtual assistant that uses a client-server type of architecture. A user 301 speaks expressions to a smartphone 302. The smartphone 302, when running a virtual assistant app, behaves as a remote client device for a server-based virtual assistant. The smartphone 302 sends expressions from the user 301 as queries for the virtual assistant. The client device 302 communicates the query audio through a computer network 303 to send the expression audio to a server 304. Server 304 uses a computer processor to execute code stored on a non-transitory computer readable medium. By processing the instructions, the computer processor performs automatic speech recognition 305 on the expression audio to produce a token sequence hypothesis. The computer processor uses the token sequence hypothesis as input to perform rewriting 306 to produce a new rewritten token sequence hypothesis. The computer processor attempts to parse the new rewritten token sequence hypothesis using natural language processing (NLP) 307. The rewriting uses the result of NLP parsing 307 to decide whether to perform another rewrite or output the new rewritten token sequence from the server 304. After choosing a parse with an acceptably high score, the computer processor processes 308 the chosen interpretation to produce a desirable result. The processing may be performed locally within the server 304, or by using a service of a third-party system. For example, for a query like, "what is the weather?", the processing 308 sends an application programming interface (API) request, including the current location of the smartphone, to a third-party weather service. Such weather information services respond to API requests with text descriptions of weather conditions. Many other sources of information and types of services are well known for virtual assistants. The server 304 uses the result of processing, such as text responses to API requests, to generate a spoken response, for the user 301, as text. The computer processes the spoken response text using text-to-speech (TTS) 309 to produce an audio response for the user. The server 304 sends the audio through network 303 to client 302, which outputs it to the user through a speaker. Many other variations are possible in other embodiments. For example, in other embodiments the server 304 provides text responses to client 302, either instead of or in addition to audio responses.

Figure 31A:
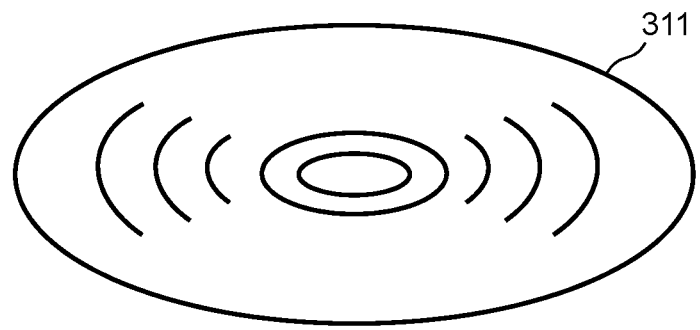
FIG. 31A shows a disk non-transitory computer readable medium according to an embodiment.
Figure 31B:
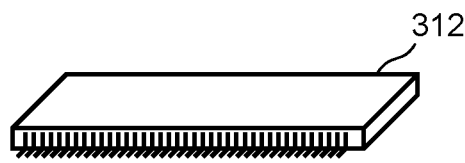
FIG. 31B shows a flash memory non-transitory computer readable medium according to an embodiment.
Figure 31C:
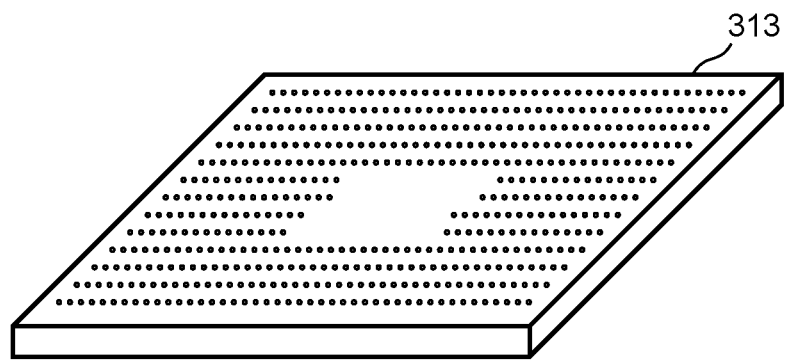
FIG. 31C shows a system-on-chip processor according to an embodiment.
Figure 31D:
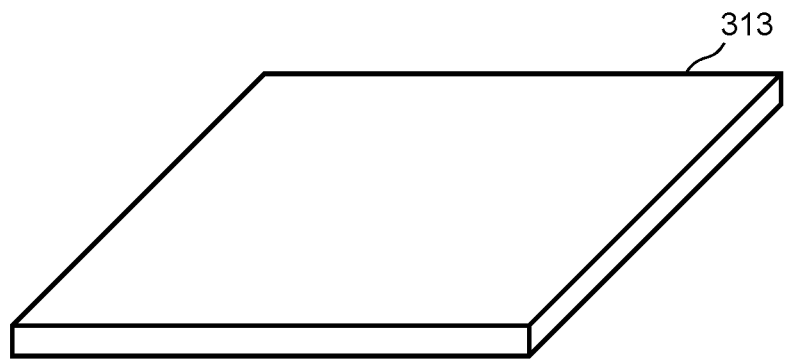
FIG. 31D shows a system-on-chip processor medium according to an embodiment.

FIG. 31A shows a rotating disk 311, which is a non-transitory computer readable medium according to some embodiments.

FIG. 12B shows a Flash memory chip 312, which is a non-transitory computer readable medium according to some embodiments.

FIG. 12C shows the bottom side of a packaged system-on-chip device 313 with a ball grid array for soldering to a printed circuit board. System-on-chip 313 is a computer processor according to some embodiments.

FIG. 12D shows the top side of system-on-chip device 313.

Figure 32:
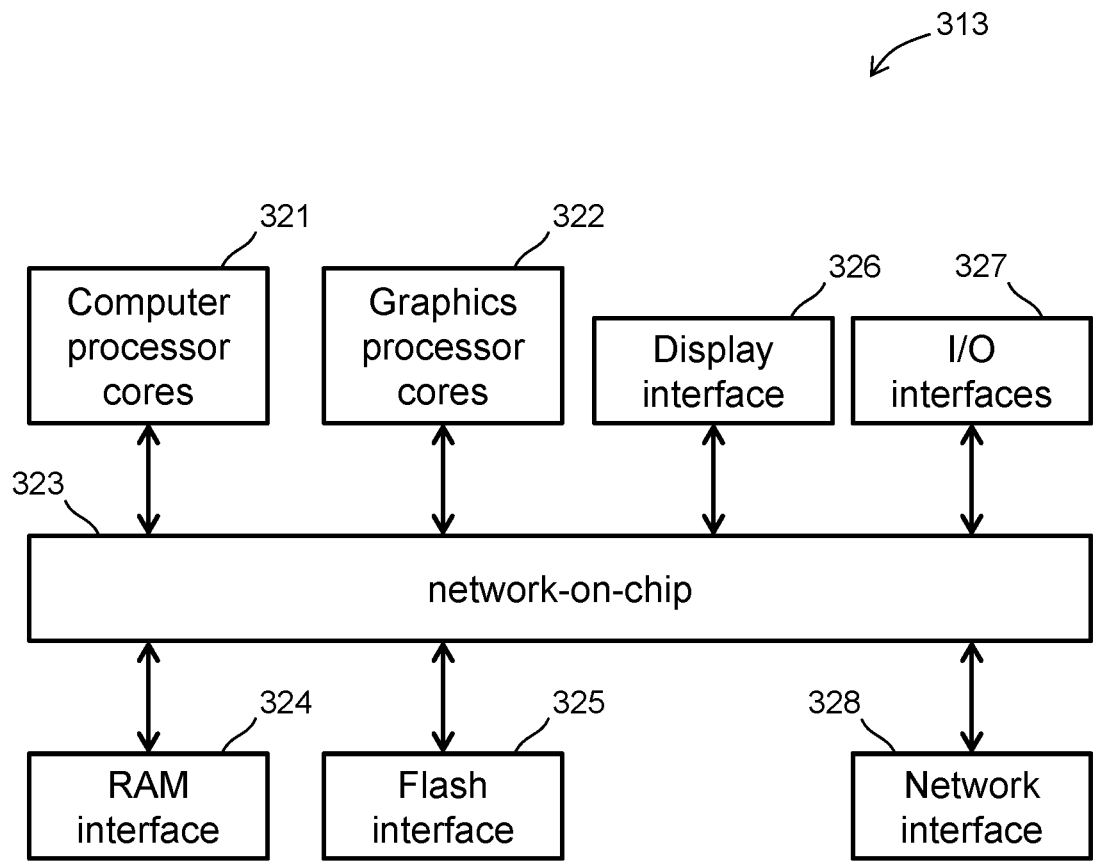
FIG. 32 shows a block diagram of a system-on-chip according to an embodiment.

FIG. 32 shows a block diagram of functional components within the system-on-chip chip 313 according to some embodiments. Computer processor cores 321 and graphics processing cores 322 perform processing by communicating through an interconnect 323 with a random access memory (RAM) through RAM a interface 324 for temporary data storage, a Flash RAM through a Flash interface 325, and a network interface 325 for communication with servers. A display interface 326 provides access to display information to a user, and a I/O interface 327 provides for receiving user input and providing output to users.

Figure 33:
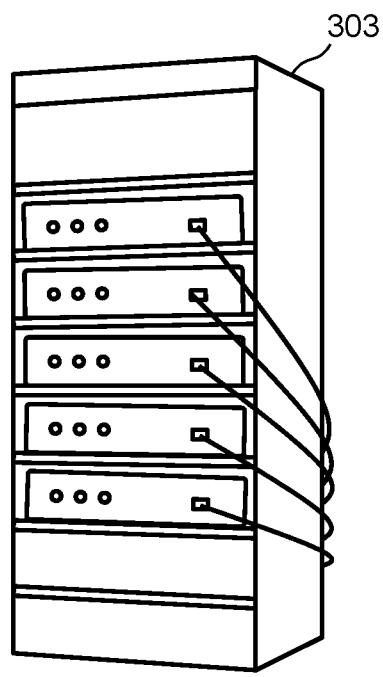
FIG. 33 shows a server system according to an embodiment.

FIG. 33 shows a rack-based multi-processor server 303 according to some embodiments.

Figure 34:
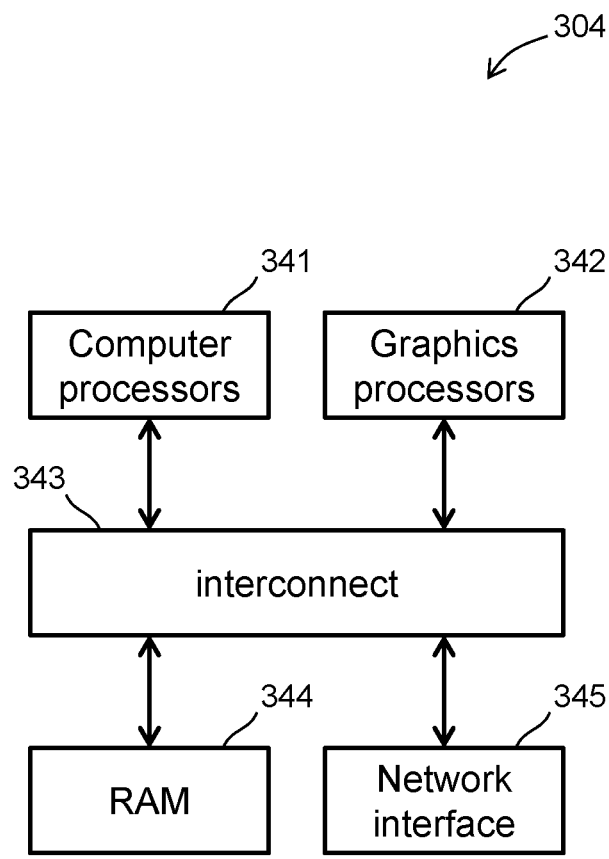
FIG. 34 shows a block diagram of a server system according to an embodiment.

FIG. 34 shows a block diagram of functional components within a server 304 according to some embodiments. Computer processors 341 and graphics processors 342 perform processing by communicating through an interconnect 343 with a RAM 344 for temporary data storage and a network interface 345 for communication with other servers and devices.

What is claimed is:

1. A computer-implemented method of rewriting an input token sequence of a user query when providing query results to the user, the method comprising:
   receiving, over a computer network from an application executing on a remote client device, a user query from a system user, the query comprising the input token sequence;
   determining forward probabilities, according to a forward statistical language model, for a plurality of tokens in the input token sequence;
   determining backward probabilities, according to a backward statistical language model, for a plurality of tokens in the input token sequence;
   inserting a new token at a location after a first token having a low backward probability and before an adjacent second token having a low forward probability to create a new rewritten token sequence;
   processing the new rewritten token sequence to produce a result; and
   providing a response, indicating the result of the processing, to the system user.

2. A computer-implemented method of rewriting an input token sequence, the method comprising:
   determining forward probabilities, according to a forward statistical language model, for a plurality of tokens in the input token sequence;
   determining backward probabilities, according to a backward statistical language model, for a plurality of tokens in the input token sequence;
   computing a probability score for each of the plurality of tokens based on a lowest one of the forward probabilities and a lowest one of the backward probabilities; and
   replacing, with a new token, a token having a lowest probability score among the computed probability scores for the plurality of tokens to create a new rewritten token sequence.

3. A computer-implemented method of rewriting an input token sequence, the method comprising:
   determining forward probabilities, according to a forward statistical language model (SLM), for a plurality of tokens in the input token sequence;
   determining backward probabilities, according to a backward statistical language model, for a plurality of tokens in the input token sequence; and
   replacing a suspicious token having a forward probability below a first threshold and a backward probability below a second threshold with a new token to create a new rewritten token sequence.

4. The method of claim 3, further comprising:
   substituting a tag for at least one token in the input token sequence prior to determining probabilities.

5. The method of claim 3, further comprising:
   choosing, as the new token, one that is both in a list of highest probability tokens according to the forward SLM and a list of highest probability tokens according to the backward SLM.

6. The method of claim 5, further comprising:
   performing a syntactic analysis of the input token sequence according to syntax rules; and
   restricting the choosing to only tokens that are syntactically legal in context of neighboring tokens according to the syntax rules.

7. The method of claim 5, further comprising:
   computing, for the new rewritten token sequence, a rewrite score that depends at least on the probability of the new token in the forward SLM and the probability of the new token in the backward SLM.

8. The method of claim 7, further comprising:
   scaling the rewrite score based on the probability of the new token in a diverse corpus SLM that was built from expressions related to a wide variety of topics.

9. The method of claim 5, further comprising:
   replacing the suspicious token with an alternative new token to create an alternative rewritten token sequence;
   computing, for the alternative rewritten token sequence, an alternative score as a combination of both the probability of the alternative new token in the forward SLM and the probability of the alternative new token in the backward SLM; and
   choosing whichever of the new rewritten token sequence and the alternative rewritten token sequence has a higher score.

10. The method of claim 5, further comprising:
    maintaining a token buffer of hypothesized tokens from recent continuous speech,
    wherein the input token sequence is a sequence of tokens in the token buffer.

11. The method of claim 3, further comprising:

storing a history cache of tokens present in recent token sequences;

for replacing the suspicious token, choosing the new token from each of a list of forward most probable tokens and a list of backward most probable tokens; and increasing the probability score of at least one token that is present in the history cache.

12. The method of claim 3, further comprising:

parsing the new rewritten token sequence according to a grammar using a natural language parser to produce a parse score.

13. The method of claim 12, further comprising:

replacing an alternative suspicious token different from the suspicious token to create an alternative rewritten token sequence;

parsing the alternative rewritten token sequence according to the grammar using the natural language parser to produce an alternative parse score; and choosing whichever of the new rewritten token sequence and the alternative rewritten token sequence has a higher parse score.

14. The method of claim 12, further comprising:

replacing the suspicious token with an alternative new token to create an alternative rewritten token sequence;

parsing the alternative rewritten token sequence according to the grammar using the natural language parser to produce an alternative parse score; and choosing whichever of the new rewritten token sequence and the alternative rewritten token sequence has a higher parse score.

15. The method of claim 12, further comprising:

using a tree-based algorithm to iteratively perform rewrites and compute scores for each rewrite to produce a set of rewrites from which to choose one with a best score.

16. The method of claim 3, further comprising:

storing the input token sequence in a cache;

storing the new rewritten token sequence in the cache in association with the input token sequence; and searching the cache for the input token sequence.

17. The method of claim 16, further comprising:

analyzing the cache to identify, for the new rewritten token sequence, a most frequent input token sequence that was rewritten to the new rewritten token sequence.

18. The method of claim 17, further comprising:

creating a grammar rule to cover the most frequent input token sequence that was rewritten to the new rewritten token sequence.

19. The method of claim 17, further comprising:

adapting a grammar rule to cover the most frequent input token sequence that was rewritten to the new rewritten token sequence.

\* \* \* \* \*